US010210353B1

(12) United States Patent
Li et al.

(10) Patent No.: US 10,210,353 B1
(45) Date of Patent: Feb. 19, 2019

(54) ASSET TAG TRACKING SYSTEM AND NETWORK ARCHITECTURE

(71) Applicant: ABL IP HOLDING LLC, Conyers, GA (US)

(72) Inventors: Xiangrong Li, Brookline, MA (US); Jesse Grant, Needham, MA (US); Sajin George, Somerville, MA (US); Emanuel Paul Malandrakis, Boston, MA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/916,861

(22) Filed: Mar. 9, 2018

(51) Int. Cl.
G06K 7/10 (2006.01)
G06K 7/00 (2006.01)
G06K 17/00 (2006.01)

(52) U.S. Cl.
CPC ....... *G06K 7/0008* (2013.01); *G06K 7/10099* (2013.01); *G06K 7/10475* (2013.01); *G06K 2017/0045* (2013.01)

(58) Field of Classification Search
CPC .......................... G06K 7/0008; G06K 7/10475
USPC ....................................................... 340/10.1
See application file for complete search history.

(56) References Cited

U.S. PATENT DOCUMENTS

| 5,917,425 A | 6/1999 | Crimmins et al. |
| 6,657,549 B1 | 12/2003 | Avery |
| 6,862,430 B1 * | 3/2005 | Duffy .................. H04B 7/2606 370/252 |
| 7,312,752 B2 | 12/2007 | Smith et al. |
| 7,324,824 B2 | 1/2008 | Smith et al. |
| 7,372,365 B2 | 5/2008 | Jackson |
| 7,528,716 B2 | 5/2009 | Jackson |
| 7,545,326 B2 | 6/2009 | Caliri et al. |

(Continued)

FOREIGN PATENT DOCUMENTS

| EP | 1439649 A1 | 7/2004 |
| WO | 2008006077 A2 | 1/2008 |
| WO | 2012175957 A1 | 12/2012 |

OTHER PUBLICATIONS

U.S. Appl. No. 15/916,893, filed Mar. 9, 2018, 51 pages.

(Continued)

*Primary Examiner* — Vernal U Brown
(74) *Attorney, Agent, or Firm* — RatnerPrestia

(57) ABSTRACT

Examples of a system and a method for asset tracking are provided. The system includes wireless communication nodes in a space that receive a basic message including an asset tracking tag identifier and a basic message sequence number transmitted by an asset tracking tag. The wireless communication nodes measure a received basic message signal attribute, and transmit a node asset message including the asset tracking tag identifier, the basic message sequence number, a node identifier, and the measured signal attribute of the received basic message to an edge gateway. The edge gateway may receive the transmitted node asset message transmitted by each of some number of the wireless communication nodes and rank respective node identifiers extracted from the received node asset messages based the measured signal attribute. The edge gateway forwards an aggregated message to a fog gateway for obtaining an estimate of the location of the asset tracking tag.

21 Claims, 13 Drawing Sheets

(56) References Cited

U.S. PATENT DOCUMENTS

| | | |
|---|---|---|
| 7,577,444 B2 | 8/2009 | Bird et al. |
| 7,602,338 B2 | 10/2009 | Smith et al. |
| 7,719,418 B2 | 5/2010 | Grossman |
| 7,791,470 B2 | 9/2010 | Karr |
| 7,872,581 B2 | 1/2011 | Darianian et al. |
| 7,941,096 B2 | 5/2011 | Perkins et al. |
| 7,965,174 B2 | 6/2011 | Wong et al. |
| 8,019,354 B2 | 9/2011 | Rae et al. |
| 8,026,814 B1 | 9/2011 | Heinze et al. |
| 8,031,120 B2 | 10/2011 | Smith et al. |
| 8,089,344 B1 | 1/2012 | Zand |
| 8,149,090 B2 | 4/2012 | Hall et al. |
| 8,155,664 B2 | 4/2012 | MacFarland |
| 8,294,568 B2 | 10/2012 | Barrett |
| 8,305,190 B2 | 11/2012 | Moshfeghi |
| 8,373,562 B1 | 2/2013 | Heinze et al. |
| 8,400,268 B1 | 3/2013 | Malik et al. |
| 8,531,273 B2 | 9/2013 | Overhultz et al. |
| 8,558,672 B2 | 10/2013 | Zand |
| 8,598,988 B2 | 12/2013 | Overhultz et al. |
| 8,674,806 B1 | 3/2014 | Malik et al. |
| 8,674,829 B1 | 3/2014 | Karam et al. |
| 8,787,961 B2 | 7/2014 | Skalicky |
| 8,854,205 B2 | 10/2014 | Daniel |
| 8,867,993 B1 | 10/2014 | Perkins et al. |
| 9,100,788 B2 | 8/2015 | Karam et al. |
| 9,138,825 B2 | 9/2015 | Albrect et al. |
| 9,324,202 B2 | 4/2016 | Lindig et al. |
| 9,436,858 B2 | 9/2016 | Liao |
| 9,525,969 B2 | 12/2016 | Evans et al. |
| 9,711,047 B1 | 7/2017 | Knas et al. |
| 9,711,048 B1 | 7/2017 | Knas et al. |
| 9,721,451 B1 | 8/2017 | Knas et al. |
| 9,741,237 B1 | 8/2017 | Knas et al. |
| 9,877,266 B1 | 1/2018 | Knas et al. |
| 9,877,298 B1 | 1/2018 | Knas et al. |
| 9,881,484 B1 | 1/2018 | Knas et al. |
| 9,949,091 B1 | 4/2018 | Knas et al. |
| 9,984,556 B1 | 5/2018 | Knas et al. |
| 2006/0097046 A1 | 5/2006 | Fassio et al. |
| 2008/0231449 A1 | 9/2008 | Moshfeghi |
| 2010/0110948 A1 | 5/2010 | Batta |
| 2010/0214116 A1 | 8/2010 | Huang et al. |
| 2011/0012782 A1 | 1/2011 | Lee et al. |
| 2012/0001728 A1 | 1/2012 | Janiszewski |
| 2012/0050101 A1 | 5/2012 | Whiteman |
| 2012/0119883 A1 | 5/2012 | Bekritsky |
| 2012/0158238 A1 | 6/2012 | Daley et al. |
| 2013/0072223 A1 | 3/2013 | Berenberg et al. |
| 2013/0342402 A1* | 12/2013 | Pesonen ............ G01S 5/0294 342/451 |
| 2015/0085669 A1* | 3/2015 | Prechner ............ H04W 24/10 370/241 |

OTHER PUBLICATIONS

Beutel, J., "Geolocation in a PicoRadio Environment," Diploma Thesis, Jul. 1999—121 pages.

Savvides et al., "Dynamic Fine-Grained Localization in Ad-Hoc Networks of Sensors," Technical Report TM-UCLA-NESL, 2001, 14 pages.

Non-final Office Action for U.S. Appl. No. 15/916,893, dated Dec. 14, 2018, 39 pages.

* cited by examiner

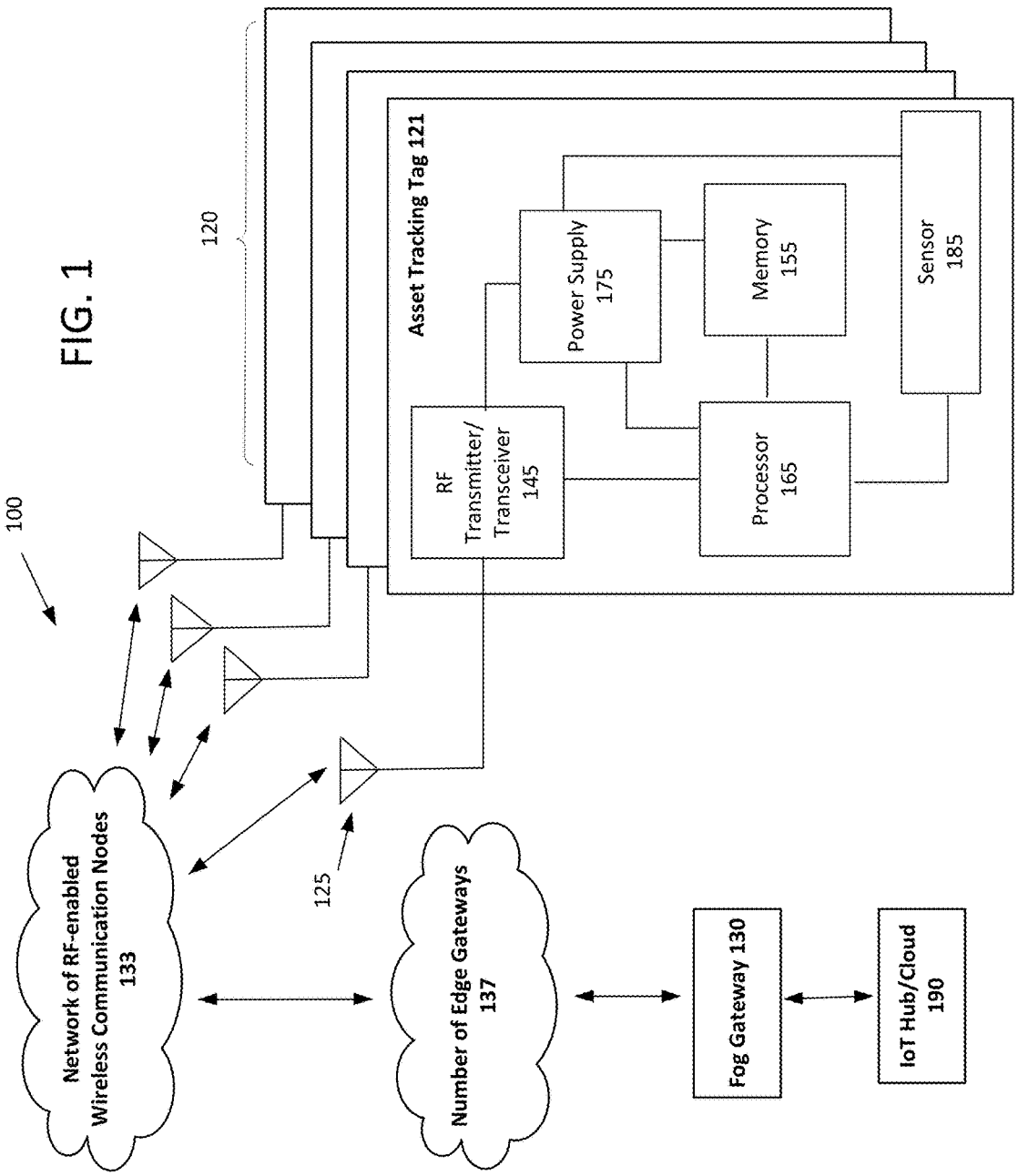

200

200

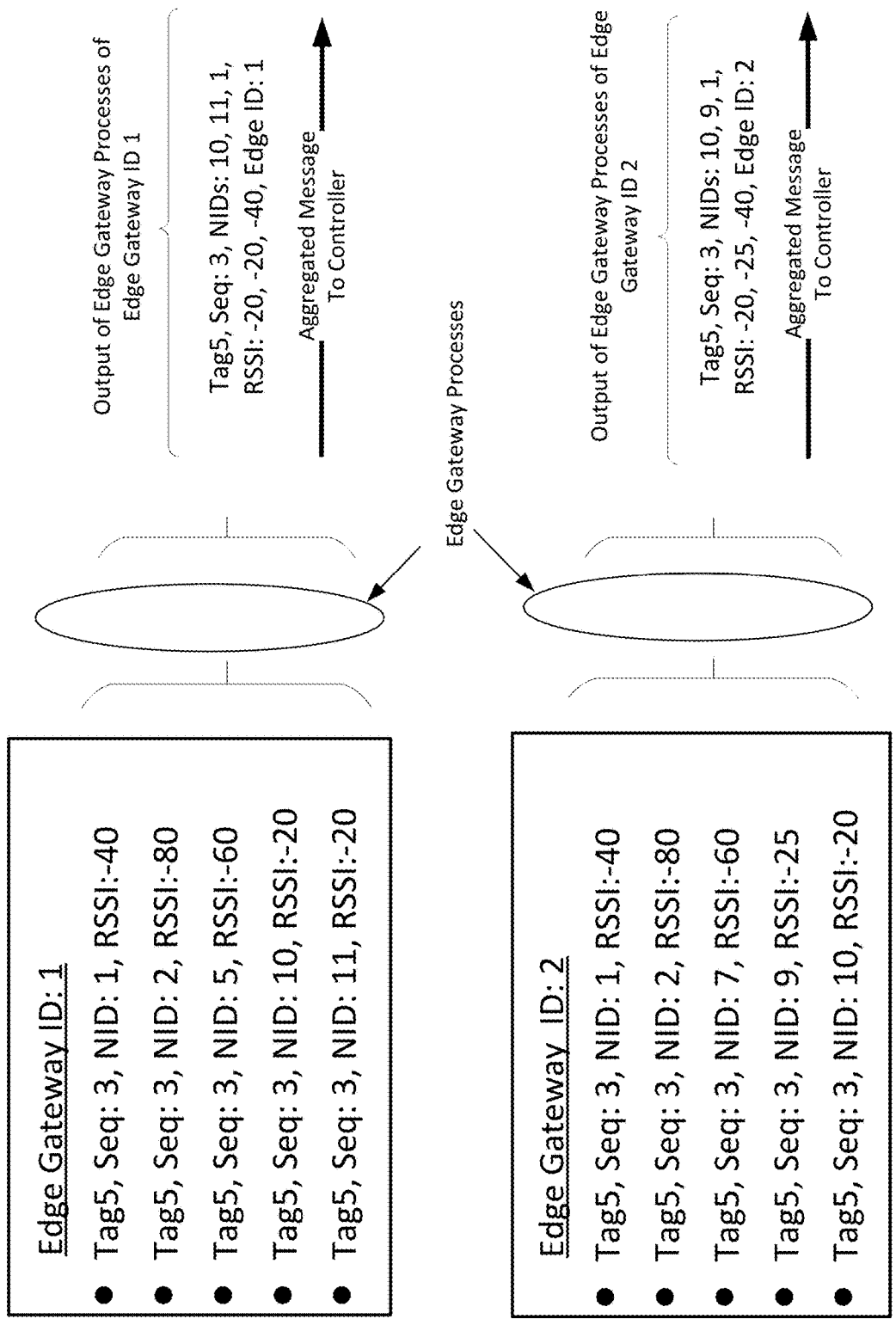

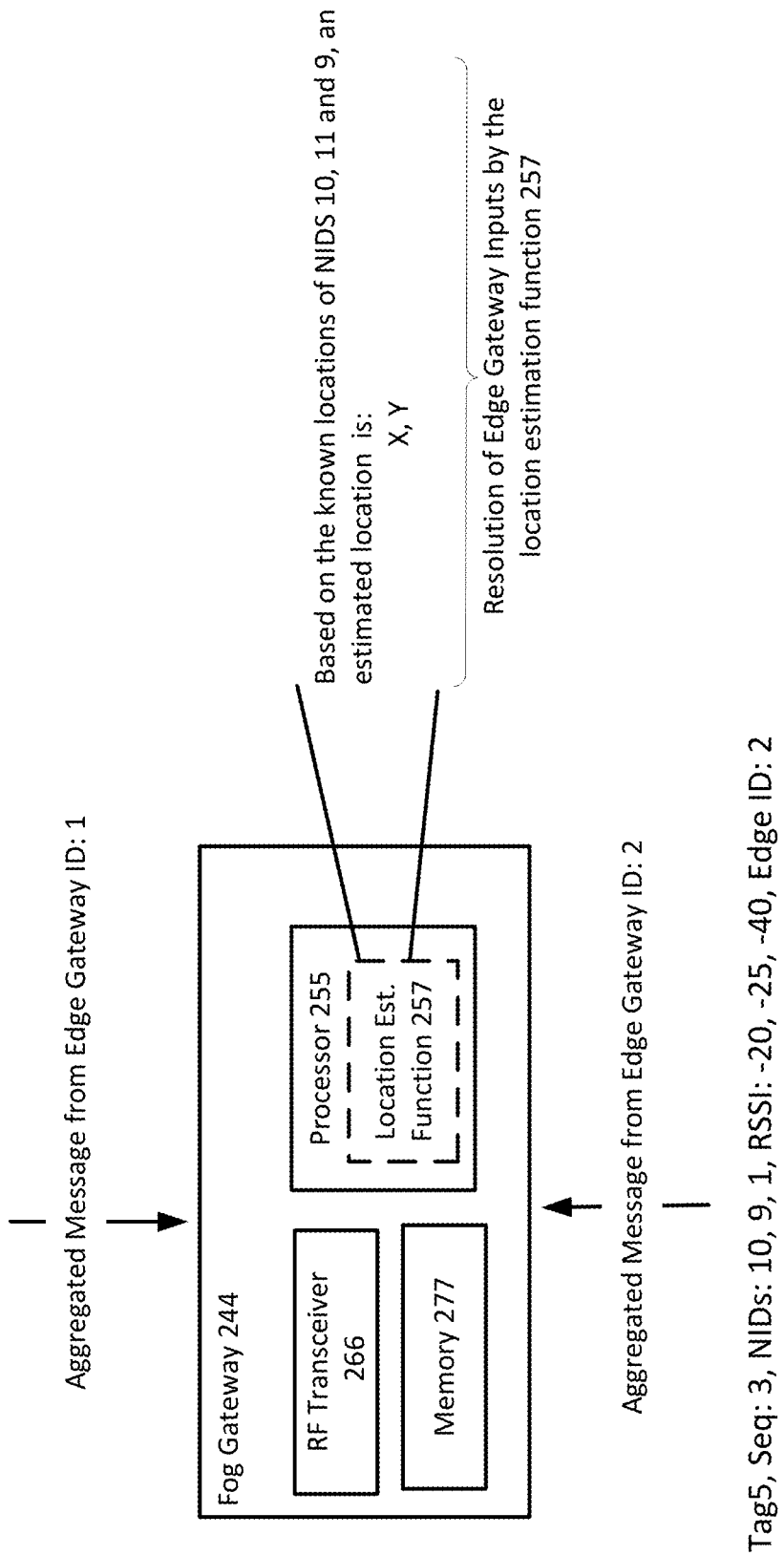

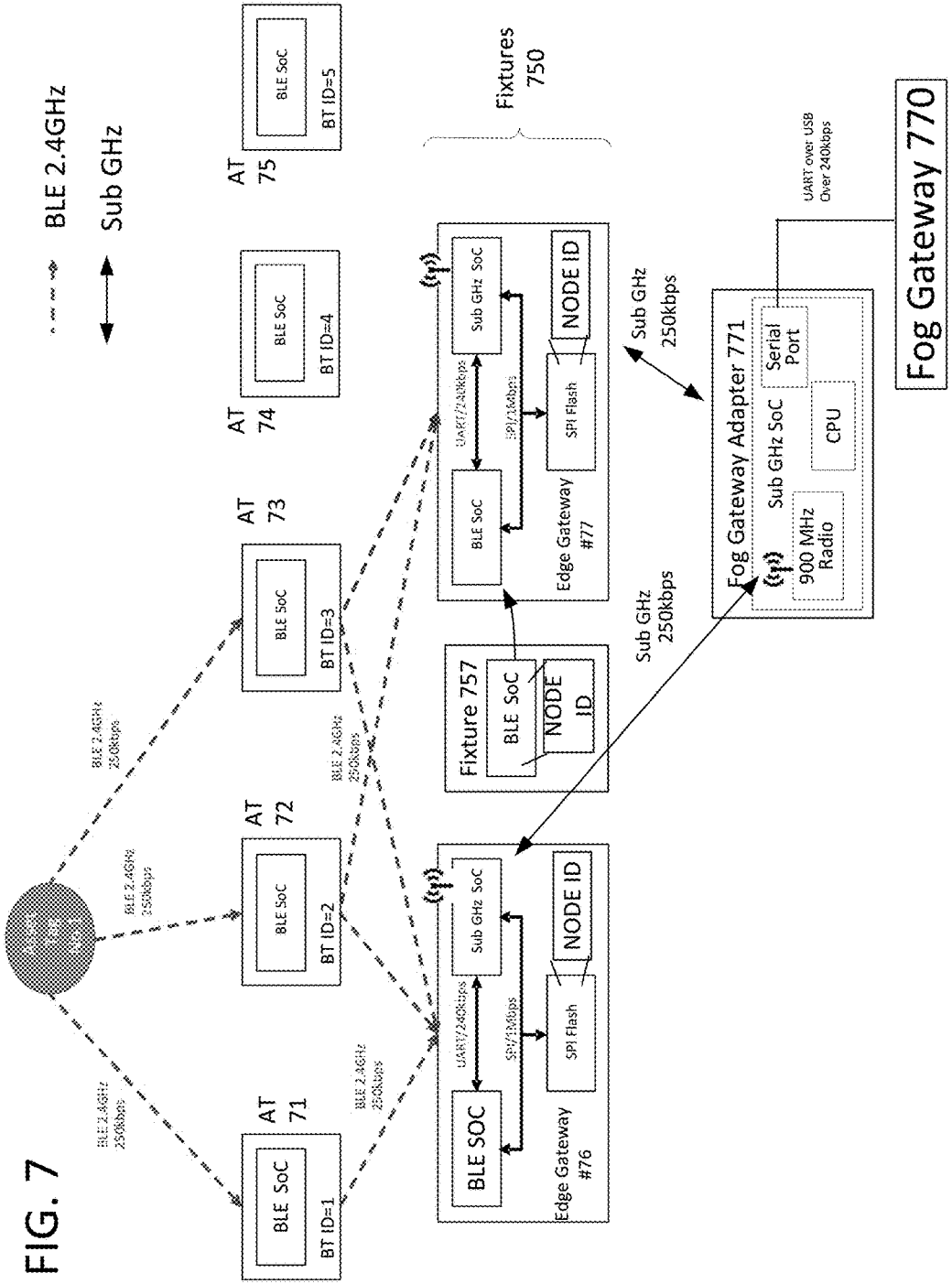

ASSET TAG TRACKING SYSTEM AND NETWORK ARCHITECTURE

CROSS-REFERENCE TO RELATED APPLICATION

This patent application is related to Applicant's contemporaneously filed patent application Ser. No. 15/916,893 entitled More Accurate Asset Tag Locating Of Radio Frequency Devices. The entire contents of which are incorporated herein by reference.

TECHNICAL FIELD

In various examples, the present subject matter relates generally to a system and method for estimating a location of an asset tracking tag within a space while minimizing data traffic within a wireless network that supports the tracking.

BACKGROUND

Previous systems relied upon the detection of an asset tracking device, commonly referred to as an "asset tag," by a detection device. For example, the asset with the tag would pass by the detection device and the detection device would by some detection means detect the "tag" or other identifier attached to the asset. The asset tracking system would know the location of the asset because the system would have knowledge of the location of the detection device.

An asset tracking tag may be or include a radio frequency identifying (RFID) tag or the like attached to the asset. Like a barcode, the RFID tag provides information about or associated with the asset, such as a particular tag identifier. However, as RF technology has advanced, the RF transceivers have become more power efficient and smaller thereby allowing RF transceivers with greater range and computing power to be employed in the asset tracking tags.

With the advances in RF technology comes the problem of increased RF signal traffic within a space as well as increased data processing demands on devices within the space coupled to the data network. In addition, the advanced RF technology brings an expectation of improved accuracy in the determination of asset tag location within a space.

Presently, systems utilize complex and overly complicated computations and require large data sets to provide location determination services. As a result, data network traffic is increased without necessarily providing a corresponding increase in the accuracy of the location estimation.

SUMMARY

Hence, there is room for further improvement in an asset tracking tag location estimation process that is configured to reduce data and provide a location estimate accuracy suitable for tracking movement of items associated with the asset tracking tag within a space.

Provided is an example of a method that includes receiving, at three or more wireless communication nodes distributed about a space, a basic message transmitted by an asset tracking tag. The basic message may include an identifier of the asset tracking tag and a basic message sequence number. A signal attribute of the received basic message may be measured at each of the three or more wireless communication nodes. The measured signal attribute may be associated with a node identifier of the respective wireless communication node making the signal attribute measurement. Each of the three or more wireless communication nodes may transmit a node asset message to an edge gateway. The node asset message may include the asset tracking tag identifier, the basic message sequence number, a node identifier of the respective one of the three or more wireless communication nodes transmitting the respective node asset message, and the measured signal attribute of the basic message measured by the respective one of the three or more wireless communication nodes transmitting the respective node asset message. The edge gateway may receive the respective transmitted node asset message transmitted by each of the three or more wireless communication nodes. The edge gateway may determine the respective node identifiers of a number of nodes nearest to the asset tracking tag based on the measured signal attribute of the basic. The edge gateway forwards to a fog gateway of the space an aggregated message. The aggregated message may include the asset tracking tag identifier, the basic message sequence number, and a list of the number of node identifiers in association with a respective one of the highest measured signal attribute values, the aggregated message for obtaining an estimate of the location of the asset tracking tag.

A provided system example may include a plurality of wireless communication nodes distributed about a space, a number of edge gateways and a fog gateway. Each of the plurality of wireless communication nodes may include a processor, a memory, and a node radio frequency transceiver configured to receive and transmit signals radio frequency signals. Each of the edge gateways may include a processor, a radio-frequency transceiver, and a memory. The intermediary radio-frequency transceiver may be configured to communicate with the node radio frequency transceivers of the wireless communication nodes. The fog gateway may be communicatively coupled to each of the edge gateways, the fog gateway comprising a fog gateway radio frequency transceiver, a processor and a memory, the fog gateway radio frequency transceiver configured to communicate with the edge gateway transceiver. Each of the plurality of wireless communication nodes may be configured to receive a basic message transmitted by an asset tracking tag located in the space, and measure a signal attribute of the received basic message. The measured signal attribute may be associated in the node memory the measured signal attribute with a node identifier of the wireless communication node that made the signal attribute measurement. The basic message includes an identifier of the asset tracking tag and a basic message sequence number. Each communication node may be configured to transmit a node asset message to an edge gateway of the plurality of edge gateways. The node asset message including the asset tracking tag identifier, the basic message sequence number, a node identifier of the respective wireless communication node transmitting the respective node asset message, and the measured signal attribute of the basic message measured by the respective wireless communication node transmitting the respective node asset message. The edge gateway of the wireless communication nodes may be configured to receive the respective transmitted node asset message transmitted by each of the three or more wireless communication nodes. The edge gateway may determine respective node identifiers of a number of respective nodes nearest to the asset tracking tag based on the measured signal attribute of the basic message included in each respective node asset message. An aggregated message may be forwarded to the fog gateway by the at least one edge gateway. The aggregated message may be for obtaining an estimate of the location of the asset tracking tag using the list of ranked node identifiers in the aggregated message. The aggregated message may include the asset tracking tag identifier, the basic message sequence number, and a list of the node identifiers associated with a respective one of the highest measured signal attribute values. The fog gateway may be configured to receive a respective aggregated message from each of the edge gateways; and obtain an estimate of the location of the asset tracking tag within the space based on the list of the node identifiers from the identified node identifiers having one of the highest measured signal attribute values, and the measured signal values associated with each respective node identifier in the list of node identifiers in the aggregated message forwarded by each respective edge gateway.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE FIGURES

The drawing figures depict one or more implementations in accordance with the present concepts, by way of example only, not by way of limitations. In the figures, like reference numerals refer to the same or similar elements.

FIG. 1 shows an example of an asset tracking tag configured to communicate with a system of network of RF-enabled wireless communication nodes.

FIGS. 4A and 4B depict examples of the message flows within a system, such as system 100.

FIG. 7 illustrates a specific example of a system configuration and message flow diagram that utilizes system-on-a-chip (SOC) configurations for an asset tracking tag system, such as those shown in FIGS. 2A-3.

DETAILED DESCRIPTION

Figure 2A:
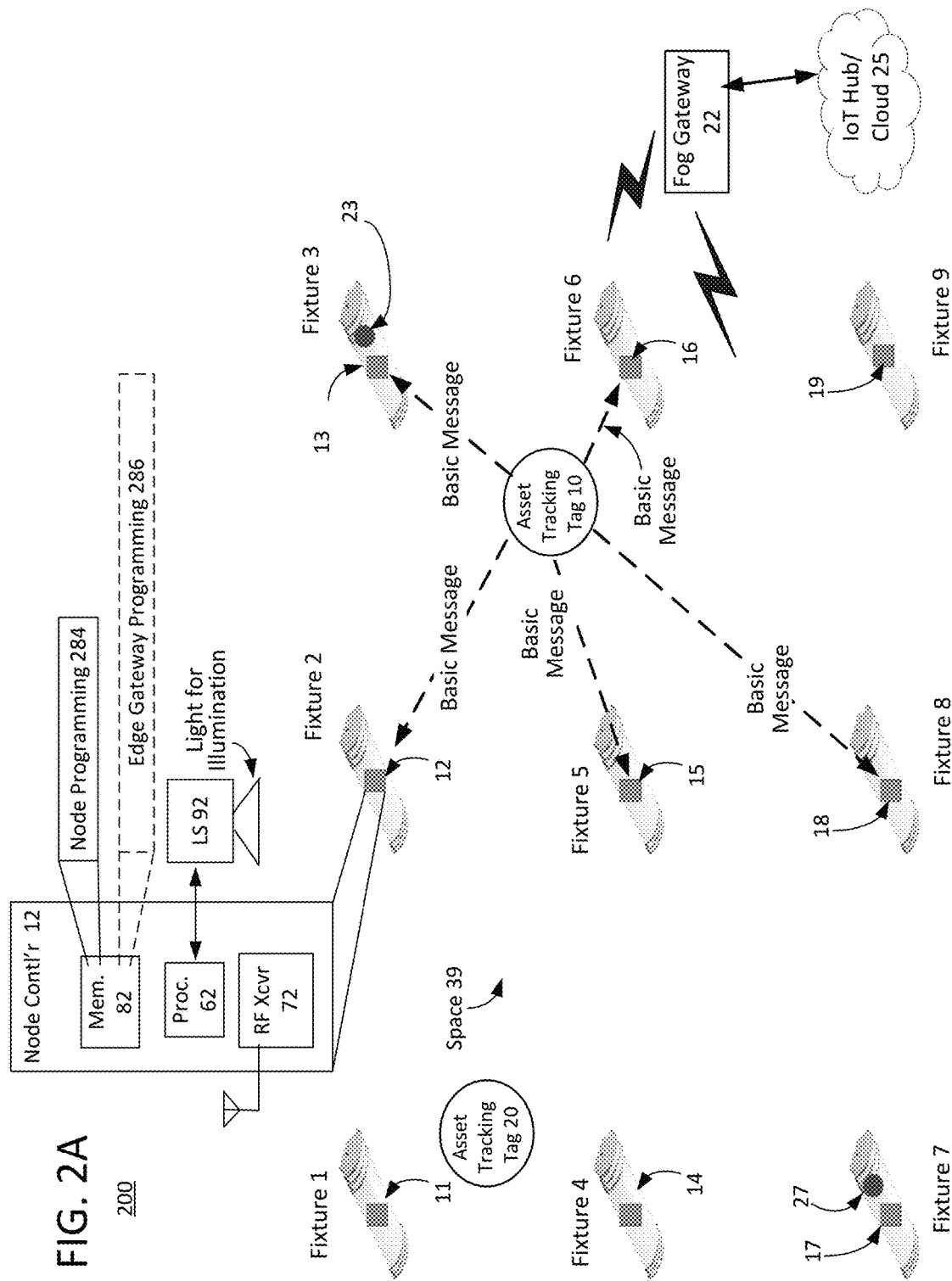
FIGS. 2A, 2B and 2C depict a simplistic system example of the functions performed by each of the system components, such as those described with reference to FIG. 1.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In such examples, an asset tracking tag is configured to provide a beacon-like signal, referred to as a basic message that enables a system to locate the asset tracking tag in the space. This basic message, which is unique to each asset tracking tag, is transmitted by the tag through the wireless network and used by a computing system (e.g., a back-end server or the gateway computing device of the local network designated as a fog gateway for tracking purposes) to estimate the location of the tag and thus the associated asset within the space. A number of such tag location determinations over time can be used to track movement of the tag and thus movement of any asset to which the tag is attached or otherwise associated. Location estimates, for example, may be used to track departures and arrivals of tags/assets for the space, and other spatial and temporal metrics of interest.

The asset tracking tag is configured to transmit a signal for reception by one or more node devices of the wireless mesh network. In some examples, the asset tracking tag does not receive signals, it only transmits a signal. The type of signaling may be configurable. For example, the asset tracking tag may only transmit a signal at set intervals based on a counter. In this example, the tag utilizes a counter in place of a clock. The counter may be settable by a remote command or the like to count up to or down from some arbitrary number, such as 10,000, 5,234, 100 or the like. Alternatively, the asset tracking tag may broadcast the basic message continuously. In another alternative, the asset tracking tag may respond to the detection of movement of the asset tracking tag and may be configured to broadcast a basic message a preset number of times or for a present number of counts. Alternatively, the asset tracking tag may detect movement, but may not transmit a basic message until no further movement is detected. Upon determining that no further movement is detected, the asset tracking tag may begin to transmit a basic message for a predetermined number of times or for a predetermined number of counts.

The basic message may include an identifier of the asset tracking tag and a basic message sequence number. The identifier of the asset tracking tag may be a unique number that uniquely identifies the asset tracking tag from all other asset tracking tags, or all asset tracking tags in a particular area. The basic message sequence number is a number assigned to each basic message that is to be transmitted from the asset tracking tag. Whenever an asset tracking tag transmits a basic message, a new basic message sequence number is transmitted.

Each basic message transmitted by each asset tracking tag may have a set "time-to-live," or TTL. One benefit of having a preset TTL is that the network of nodes does not become overwhelmed by old messages that are being continually passed around the network. The "time" may be set by the number of times the message is to be retransmitted by nodes within the network.

Other messages sent by the asset tracking tag may be, for example, asset tracking tag status messages the system status (e.g. normal, distressed, or the like), battery voltage value, environment temperature value, firmware version, the lifetime reset counter value or the like.

The RF nodes, at least some of which may be housed within a light fixture, are each configured with a radio transceiver that is radio frequency compatible with the radio frequency transmitter of the asset tracking tag. For example, the radio frequency of the radio frequency transmitter of the asset tracking tag may be the same radio frequency used by a RF transceiver of the RF nodes.

Edge gateway has a radio compatible with a radio of the light fixture nodes. Each edge gateway can accommodate communications from approximately 100 light fixtures. In some examples, the edge gateway may include one or more RF transceivers a first edge gateway radio compatible with the node RF transceivers, and a second RF transceiver compatible with a fog gateway. In other examples, a single frequency band may be used for communication from the asset tags to the nodes, to the aggregators, and the fog gateway, thereby enabling the asset tag, the nodes, the edge gateway and the fog gateway to use a single RF transceiver.

FIG. 1 shows an example of an asset tracking tag configured to communicate with a network of RF-enabled nodes in an asset tracking tag communication and location system as described herein.

The asset tracking tags 120 may be small, smart, powered devices that exchange radio signals with nodes having networked radio capability, such as the network of RF-enabled wireless communication nodes 133. The tag 121 is active in that it actively communicates to obtain and it actively processes data and sends information. In most examples, the networked nodes of network 133 are lighting devices. A tag operates in a wireless network (e.g. a mesh) of the RF-enabled lighting devices (described in more detail with FIG. 2). The asset tracking tag communication and location system 100 may include a number of asset tracking tags 120, a network of RF-enabled wireless noted, a number of edge gateways 137, a fog gateway 130 and an internet-of-things (IoT) hub 190. The system 100 is configured to enable the asset tracking tags 120 to send messages designated for delivery, for example, to one of the number edge gateway 137, or to the fog gateway 130. It may be appropriate to discuss an example configuration of one of the asset tracking tags 120 in more detail.

In order to communicate, the asset tracking tags 121 may include an antenna 125, a radio frequency (RF) transmitter or transceiver 145, a processor 165, a memory 155, and a sensor 185. The antenna 125 may be coupled to the RF transmitter or transceiver 145, and configured to receive and/or emit signals within a specific radio frequency band that is compatible with the RF transmitter or receiver 145. The RF transmitter/transceiver 145 may be a Bluetooth transmitter/transceiver, a Zigbee transmitter/transceiver, a radio frequency identifier (RFID) transmitter/transceiver, a Wi-Fi transmitter/transceiver or other wireless communication transmitter/transceiver suitable for use in an asset tracking tag.

The processor 165 may be coupled to the RF transmitter/transceiver 145, the power supply 175, the memory 155 and the sensors 185. The processor 165 may send signals to the RF transmitter/transceiver 145 for transmission and/or receive signals received by the RF transmitter/transceiver 145 obtained via the antenna. For example, the fog gateway 130 may be able to download commands via the number of edge gateways 137 to individual nodes (not shown) within the network of RF-enabled wireless communication nodes 133.

The memory 155 may be a non-volatile memory, random access memory (RAM), read only memory (ROM), a Flash memory or the like. The memory 155 may be configured to store programming instructions executable by the processor 165. Upon execution of the programming instructions stored in the memory 155, the processor 165 may be configured to perform different functions. Examples of the different functions that the processor 165 may be configured to perform upon execution of the programming instructions are described in more detail with reference the examples of FIGS. 2-6. The different functions may be internal to the processor 165. For example, the processor 165 may include a counter that is monitored by the processor 165. At a predetermined count, the processor 165 may transmit a signal, such as a basic message.

The power supply 175 may be a battery, a solar cell, or other form of quickly available power that is suitable for driving the various electronics associated with the asset tracking tag 121 components, such as the RF transmitter/transceiver 145, the processor 165, the memory 155 and/or the sensor 185.

The sensor 185 may be configured to detect and respond to an event that occurs in the environment in which the asset tracking tag 121 is located. For example, the sensor 185 may be, for example, one or more of an accelerometer, thermometer, a photocell, a microphone, a shock sensor, or the like. In response to a detected stimulus (e.g., temperature, movement, noise, ambient light), the sensor 185 may output a signal causing the processor 165 to perform a function or process.

Examples of such a function or process are described in more detail with reference to other figures. For example, each of the asset tracking tags, such as 121, may be configured to transmit signals, such as a basic message, an asset tag status message and other signals, to one or more of the RF-enabled wireless communication nodes of the network 133. One or more of the RF-enabled wireless communication nodes of the network 133 may be configured to receive the signals transmitted from respective asset tracking tags 120.

The asset tracking tags 120 may also be configured to receive signals, for example, from the fog gateway 130 via the network of the edge gateways and the network of wireless RF-enabled nodes. More details of this function of the example of system 100 is described in reference to other figures.

The number of individual RF-enabled wireless communication nodes in the network of RF-enabled wireless communication nodes 133 may be 10, 100, 1000 or more. Each of the RF-enabled wireless communication nodes (shown in other examples) of the network of RF-enabled wireless communication nodes 133 may be configured with an RF transceiver compatible to communicate with the RF transmitter/transceiver of the asset tracking tags 120. The RF transceiver of a respective node in the network 133 may be a Bluetooth transceiver, a Zigbee transceiver, a radio frequency identifier (RFID) transceiver, a Wi-Fi transceiver or other wireless communication transceiver.

The respective RF-enabled nodes of the network 133 may be configured to transmit signals to the number of edge gateways 137. The signals transmitted by the respective RF-enabled node may include information obtained from the signals transmitted by the respective ones of the asset tracking tags 120.

The number of edge gateways 137 may include one or more individual edge gateways. The number of edge gateways 137 may be less than the number of nodes in the network of RF-enabled wireless communication nodes 133. Each of the edge gateways of the number of edge gateways 137 may be include a processor, a first radio-frequency transceiver, a second radio-frequency transceiver, and a memory (not shown in this example). For example, the first radio-frequency transceiver of each edge gateway may be configured to operate in the first frequency band compatible with the first node radio frequency transceiver. The second node radio frequency transceiver of each edge gateway may be configured to receive and transmit signals in a second frequency band different from the first frequency band. The edge gateways of the network 137 may use the second radio frequency transceiver to receive and transmit signals in the second frequency band from and to the fog gateway 130. For example, each edge gateway may be configured to receive signals according to a first communication protocol in the first RF band (e.g., Bluetooth), translate and/or convert the received signals into a second communication protocol in the second RF band (e.g. sub-GHz). Details of an edge gateway will be described in more detail with reference to FIG. 6.

The fog gateway 130 may include a fog gateway radio frequency (RF) transceiver, a processor and a memory (not shown in this example). The fog gateway RF transceiver may be compatible with and communication with an RF transceiver of the edge gateways. Since the fog gateway RF transceiver is compatible with an RF transceiver of the edge gateway, the fog gateway 130 may be communicatively coupled via the fog gateway radio frequency transceiver to each of the edge gateways of the number of edge gateways 137. The number of edge gateways 137 may not, for example, have an indication of the geographical location of the space. For example, the respective edge gateway may not know if it is located in Miami or Boise. However, the fog gateway 130 may have the geographical location of the edge gateway in addition to the location of the edge gateway in the space stored in the fog gateway's memory. The fog gateway 130 may also be communicatively coupled to an internet of things (IoT) hub 190. The IoT hub 190 may enable connectivity of the system 100 to other networks, such as cellular networks, wide area data networks or the like. As an alternative to storing the geographical location information regarding the number of edge gateways 137, the fog gateway 130 may access the cloud via the IOT hub/cloud 190 to obtain the geographical locations of the respective edge gateways 137 in the space. The cloud 190 may be used to store information for multiple spaces, such as the geographical location of the edge gateways and/or spaces, the locations of the respective edge gateways and nodes in respective spaces throughout a country or geographical region.

As outlined above, the asset tracking tags 120 operate with the system 100 having wireless network of nodes 133 and a number of edge gateways 137, it may be helpful first to consider a simple system configuration for use in a further discussion of an operational example.

Figure 2B:
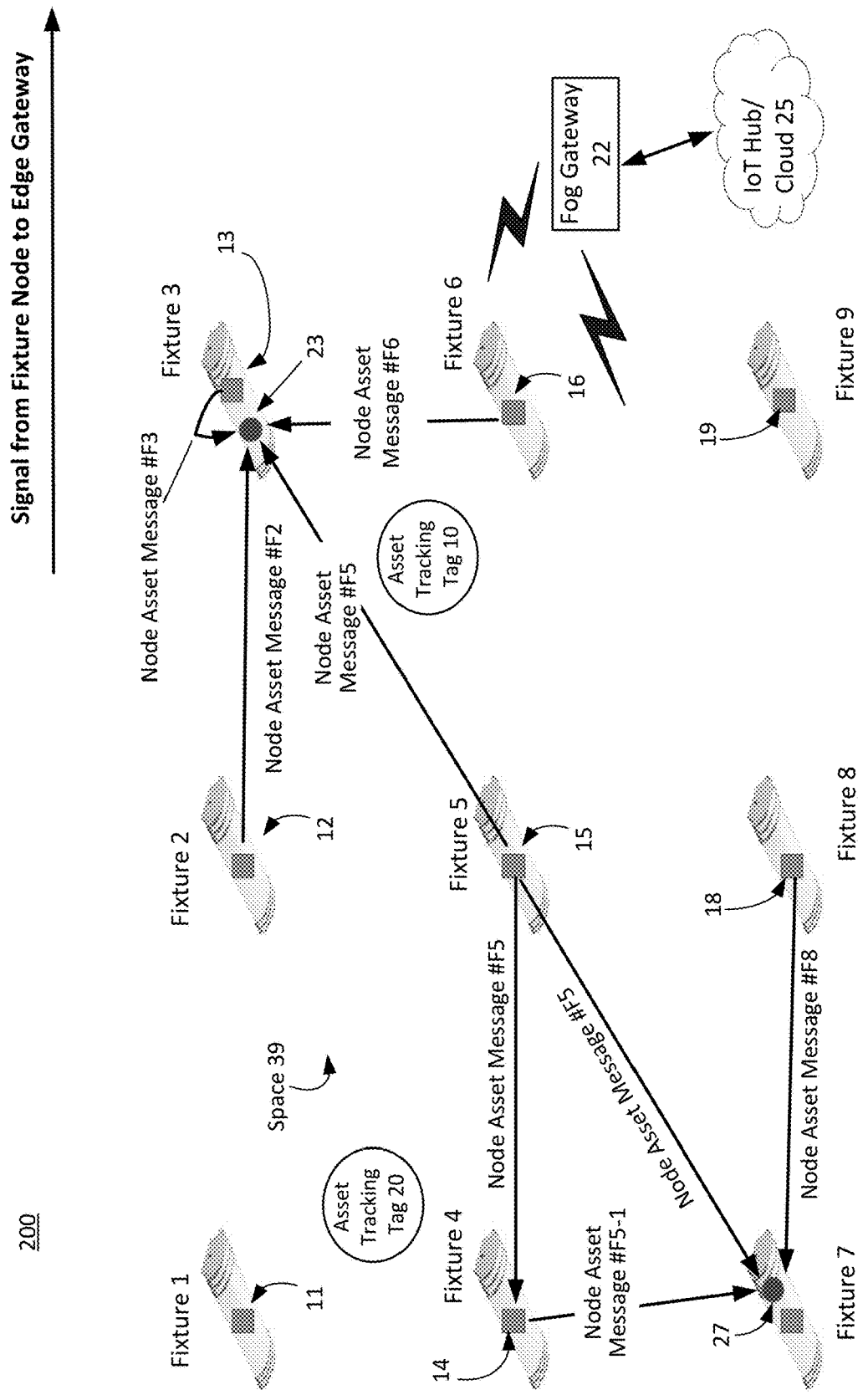
Figure 2C:
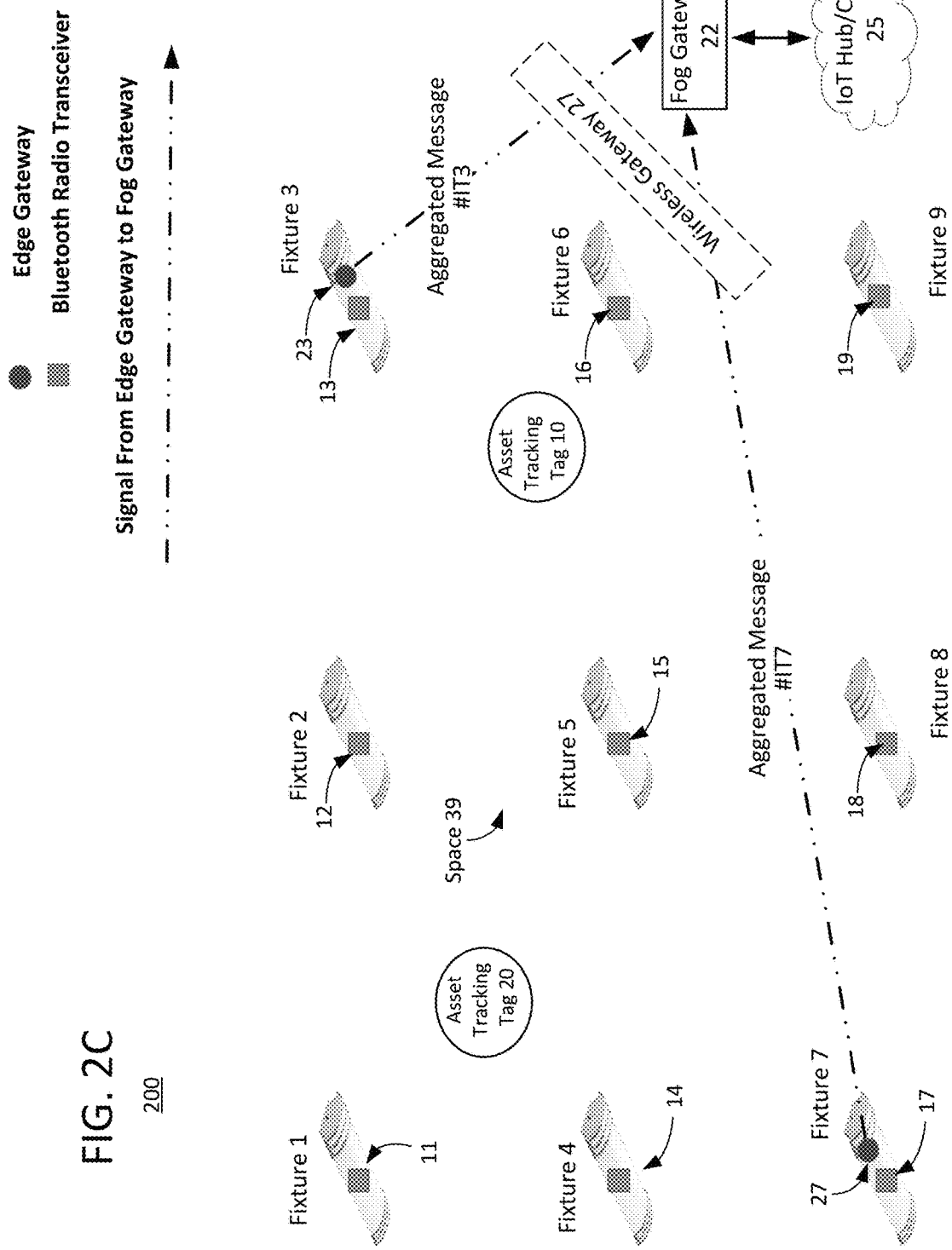

FIGS. 2A, 2B and 2C depict a simplistic system example of the functions performed by each of the system components, such as those described with reference to FIG. 1.

Similar to system 100, the simplistic system 200 of FIG. 2A includes a number of RF-enabled light fixtures 1-9, a number of edge gateways 23 and 17, and a fog gateway 22.

The several light fixtures 1-9 of the system 200 are arranged to provide general illumination within space 39, and are configured as RF-enabled wireless communication nodes in a network, such as 133 of FIG. 1. Each of the several fixtures 1-9 has a respective node controller 11-19, respectively. The respective node controllers 11-19 are configured to manage communications with the edge gateways 23, 27 and the controller 22 of system 200. The respective node controllers 11-19 are also configured to communicate with the asset tracking tags 10 and 20. The node controller 12 of light fixture 2 is shown in details and is representative of the other node controllers 11 and 13-19.

The node controller 12 may be coupled to a light source (LS) 92 that provides illumination to the space 39. The node controller 12 may include a processor 62, a radio frequency transceiver (RF Xcvr) 72, and a memory 82. The memory 82 may include programming code that when executed by the processor configures the processor 62 to perform various functions. For example, memory 82 may store node programming 284 that when executed configures the node controller 12 of fixture 2 to perform functions typically performed by nodes in the network of RF-enabled wireless communication nodes. Such node network functions are described in more detail below. In addition or alternatively, the memory 82 may store edge gateway programming 286. The edge gateway programming 286 that when executed configures the node controller 12 to perform functions associated with an edge gateway 26 or 27. The edge gateways 26 or 27 may serve to translate messages received from node controllers 11-19 into communications suitable for exchange with the fog controller 22. One purpose of the edge gateway is to deliver data, including data obtained from the received basic messages, to and receive data from the fog gateway with a different frequency (e.g. sub GHz) to avoid interference/traffic from 2.4 GHz. In addition, sub GHz radio frequency signals have a longer range than the 2.4 GHz signals to extend the coverage and distance between the edge gateways 26, 27 and the fog gateway 22. The functions of an edge gateway are described in more detail with reference to the example in FIGS. 2B, 2C, 3, 4A, 4B and other examples. The processor 62 may control the functions of the node within the network of RF-enabled wireless communication nodes.

Each of the light fixtures 1-9 may be assigned an identifier referred to as a node identifier in the network, and the node identifier may be stored in the respective memory of the respective node controller 11-19. For example, the node identifier of fixture 2 may be stored in the memory 82. Each light fixture processor, such as 62 of fixture 2, may, for example, be configured to control the light source (e.g. 92) and the RF transceiver (e.g., 72), and process signals and messages received from asset tracking tags, such as 10, within space 39, the edge gateways 23 and 27, and the fog gateway 22. For example, the node controller 12 may deliver control commands to the light source (LS) 92 of the light fixture and provide light source status information (e.g., temperature, ON duration and the like) to the fog gateway 22. Each radio frequency transceiver of the respective node controllers 11-19 may be configured to receive and transmit signals within a first frequency band. For example, the radio frequency transceivers may be a Bluetooth transceiver, such as a Bluetooth Low Energy (BLE) transceiver that is configured to operate according to the Bluetooth communication protocol and transmit and receive RF signals at a frequency of approximately 2.4 GHz.

In the example of FIG. 2A, the RF transceivers of the respective light fixtures 1-9 may be configured to communicate with a RF transceiver of asset tracking tags, such as asset tracking tag 10, within the space 39.

As shown in FIGS. 2A-C, the edge gateways of the system 200 may be collocated with one or more lighting fixtures in the space 39. For example, the edge gateways 23 and 27 are collocated with Fixture 3 and Fixture 7, respectively, of system 200. The edge gateways 27 and 23 may be configured to operate in the first frequency band compatible with the node radio frequency transceiver. For example, the edge gateways 23 and 27 may include a BLE transceiver that performs additional processing of signals received from the RF transceiver of a node controller, such as node controller 13 of fixture 3, but discards signals received from asset tracking tags 10 and 20. As an alternative to including the additional edge gateway programming 286, the edge gateway may be system-on-a-chip (SOC) (described more with reference to the example of FIG. 7 that provides all of the components (e.g., processor, memory, RF transceiver) of edge gateway and receives power from a component of the light fixture such as a driver of the light source or the like. For example, using the edge gateway SOC configuration, nearly any of fixtures 1, 4-6, 8 or 9 may also be configured to provide the edge gateway functions in addition to fixtures 2, 3 and 7 that may be programmed or are already configured as edge gateways.

The fog gateway 22 may be configured for wireless data communication with the edge gateways 27 and 23. For example, the fog gateway 22 may be configured with a radio frequency transceiver (not shown in this example) that is compatible with the radio frequency transceiver of each of the light fixtures 1-9.

In an alternative example, the edge gateways 23 and 27 may be equipped with a first RF transceiver configured to transmit and receive signals of a first frequency band, and a second RF transceiver configured to receive and transmit signals in a second frequency band different from the first frequency band. For example, first RF transceiver may be one of a Bluetooth transceiver, a Zigbee transceiver, a radio frequency identifier (RFID) transceiver, or a Wi-Fi transceiver. The first RF transceiver may also be configured to operate within a first frequency band that may include 2.4 GHz or the like, and the second frequency band may be in in the sub-GHz range, such as, for example, 900 MHz or the like. In some examples, the first RF transceiver is a Bluetooth Low Energy (BLE) transceiver.

In FIG. 2A, the asset tracking tag 10 is shown transmitting a basic message. The basic message may include an identifier of the asset tracking tag and a basic message sequence number. The asset tag identifier (ID) in the basic message may be, for example, a 6 byte asset tag ID that is unique to asset tracking tag 10. For example, the asset tag identifier (ID) may be a media access control (MAC) address of the BLE transceiver, which may be guaranteed to be globally unique by the BLE chip vendor. In a specific example, the basic message sequence number may be, for example, a 4 byte sequence number, which ensures that the sequence number will not repeat for a number of years. The number of years until a sequence number repeats is estimated to be almost 450 years.

The asset tracking tag 10 located in space 39 may transmit the basic message into the space 39 in response to an event or stimulus detected by the asset tracking tag 10. For example, an event may be a change of a counter value to a predetermined value, a timing event, receipt of an input signal from an external source, or the like. A detected stimulus may be, for example, a specific temperature, a movement, a noise above a certain level or for a predetermined duration, ambient light above a certain level, or the like.

The asset tracking tag 10 transmits the basic message into the space 39 without any intended recipient. In this respect, the transmitted basic message may be viewed as a beacon signal meant to inform any of light fixtures 1-9 in the space of the asset tracking tag's 10 identity and basic message sequence number. For ease of discussion and illustration, only one basic message is shown in FIG. 2A being transmitted by the asset tracking tag 10. However, it is envisioned that in some examples the asset tracking tag 10 may transmit a basic message approximately every 250-300 milliseconds (ms), or at a preset counter value, such as 10,000 or the like. Whenever a basic message is transmitted by the asset tag 10, the basic message sequence number of the transmitted basic message is incremented from the previous basic message sequence number in the basic message transmitted immediately prior to the latest transmitted basic message. For example, at counter value C=12000, asset tracking tag 10 may send a basic message with its tag ID (e.g. XYZ) and sequence number (e.g., 100), and, at counter value C=24000, asset tracking tag 10 may send a basic message with its tag ID XYZ and a incremented sequence number, such as 101. Asset tracking tag 20 is not transmitting any basic messages or other signals at this time.

Returning to FIG. 2A, the basic message transmitted by the asset tracking tag 10 may be received at three or more of the wireless communications nodes is distributed about the space 39. In the example of FIG. 2A, lighting fixtures 2, 3, 5, 6 and 8 of the light fixtures 1-9 receive the basic message transmitted by the asset tracking tag 10. Each of the RF transceivers in the lighting fixtures 1-9 may be configured to measure a signal attribute of the received basic message transmitted by the asset tracking tag 10. In this example, each of the three or more wireless communication nodes (i.e., lighting fixtures 2, 3, 5, and 8) measure a signal attribute to the received basic message. A signal attribute of the received signal may include the received signal strength (RSS), angle of arrival (AoA), or the like. The received signal strength (RSS) may be indicated by a value that the received signal strength indicator (RSSI). Each of the RF transceivers 11-19 may be configured to output an RSSI corresponding to the received signal to the light fixture processor (not shown in this example). The light fixture processor may control the light source and the light fixture RF transceiver, and may be configured to process the signals received from the asset tracking tag 10 as well as the RSSI output by the RF transceiver.

In the examples of FIGS. 2A-2C, the light fixtures 1-9 form a network of RF-enabled wireless communication nodes, such as 133 of FIG. 1. In a specific example, the network formed from light fixture 1-9 nodes may referred to as a flooding mesh network. Messages in the flooding mesh network topology have a time to live (TTL). The TTL may be a set period of time, a set number of hops, or the like. The TTL may also be a configuration setting of how individual nodes are supposed to respond in response to receiving a message. For example, a node processor may be configured to upon receipt of a message to lookup in a memory an identifier of the message, such as a tag ID and basic message sequence number. If the message identifier has been received previously, the node may discard the received message. Alternatively, if the node does not have the message identifier stored in memory, the node processor stores the message identifier and may send a node specific message to the RF transceiver of the node for transmission into the space 39.

A more detailed example of TTL settings is described in more detail with reference to FIG. 2B and the messaging of light fixture 5. The node specific message in the example of 2B is referred to as a node asset message, but under different conditions, the node specific message may be a message different from the node asset message. A node asset message is generated in response to receipt of a basic message. The node asset message may include, for example, the tag ID and the basic message sequence number and additional information related to the node and the received basic message. In a specific example, the node asset message may include the asset tracking tag identifier, and the basic message sequence number as well as the additional information of a node identifier, and the measured signal attribute of the basic message. An example of the node identifier may be an identifier associated with the RF transceiver, an identifier associated with the light fixture when commissioned in the network, or another identifier assigned to the particular node or light fixture.

After the node asset message is generated by the respective light fixture processor at the respective fixtures 2, 3, 5 and 8, the light fixture processor causes the RF transceiver of the respective light fixture transmits the node asset message into the space 39.

In FIG. 2B, the fixtures 2, 3, 5 and 8 that received the basic message from asset tracking tag 10 may begin processing the basic message. For example, the respective light fixture RF transceivers 12, 13, 15 and 18 may measure a respective signal attribute of the received basic message. For example, each of the light fixture RF transceivers 12, 13, 15 and 18 may measure, for example, a RSSI of the signal transmitting the basic message. After measuring the RSSI, the respective RF transceivers of the node controllers 12, 13, 15 and 18 forwards the measured RSSI to the respective processor of the respective node controller. In other words, RF transceiver 72 of node controller 12 forwards the measured RSSI to the processor 62. The processor 62 may generate a node asset message unique for fixture 2. Fixture 2's node asset message may include the RSSI value of the received basic message as measured by the RF transceiver 72, the node identifier of fixture 2, and the information in the basic message (i.e. asset tracking tag identifier and basic message sequence number) sent by the asset tracking tag 10. The node controller 12 of fixture 2 may transmit the generated node asset message, Node Asset Message #F2, into the space 39 for eventual delivery to an edge gateway, such as 23 or 27. While the node asset message is transmitted for deliver to any edge gateway, in this example, the Node Asset Message #F2 is delivered to edge gateway 23.

Similarly, the respective RF transceivers and processors of node controllers 13, 16 and 18 in fixtures 3, 6 and 8, respectively, may perform similar functions as those described above with reference to node controller 12 of fixture 2. For example, all of the other fixtures that receive the basic message from asset tracking tag 10, such as fixtures 3, 5, 6 and 8 also perform the same described measuring of the received signal strength, generation of a unique node asset message, and transmitting of a respective node asset message.

For example, node controller 16 of fixture 6 may generate and transmit Node Asset Message #F6 into space 39 for delivery to an edge gateway, such as 23 or 27. However, in the example of FIG. 2B, the edge gateway 23 receives the node asset message #F6, while edge gateway 27 does not. Similar results may occur with the transmission of other generated node asset messages, such as, for example, Node Asset Message #F3 and Node Asset Message #F6.

None of the Node Asset Messages #F2, #F3, #F6 and #F8 are shown in FIG. 2B as being delivered to another fixture (i.e. node), but are instead shown as being received directly respectively by the edge gateways 23 and 27. A more interesting case is that of the node asset message generated by node controller 15 of fixture 5. In the case of node asset message #F5 transmitted by Fixture 5, the node controller 15 causes the node asset message #F5 to be transmitted into space 39. The node asset message #F5 transmitted into space 39 may be, as may the other transmitted node asset messages, received by other fixtures in the system 200. The other fixtures, such as fixture 4 in the example of FIG. 2B, may receive the node asset message #F5. Similar to the manner explained above for the flooding network, fixture 4 receives the node asset message #F5 and the node controller 14 may begin processing the received node asset message #F5 to determine if it had been previously received at fixture 4. Since the received node asset message #F5 was not received previously by fixture 4, the node controller 14 retransmits node asset message #F5 as shown by the transmission of node asset message #F5-1 by fixture 4. For example, fixture 4 may process the node asset message #F5 by determining whether the received node asset message includes a NID and/or an RSSI. If the received node asset message includes a NID and has not been previously received by fixture 4, fixture 4 may forward the received node asset message without any modification. Alternatively, if the received message does not include a NID, fixture 4 may determine the message is a basic message transmitted by an asset tracking tag, and generate a node asset message by appending to the received basic message its NID and the measured RSSI.

The node asset message #F5-1 retransmitted from fixture 4 includes all of the same information as node asset message #F5 that was originally transmitted by fixture 5, and is received by the edge gateway 27.

In addition to node asset message #F5 being received at Fixture 4, the node asset message #F5 that was transmitted by fixture 5 is also received by the edge gateway 27 collocated with fixture 7. Edge gateway 27 also receives node asset message #F8 from fixture 8.

Each of the edge gateways 23 and 27 may be configured to perform a function or functions in response to receiving the node asset messages. For example, each edge gateway 23 and 27 may be configured to collect from the received node asset messages all of basic messages that include the same asset tracking tag ID and the same basic message sequence number, consolidate all of the collected basic messages by evaluating the signal attribute measurements contained in each of the collected basic messages, generating a aggregated message containing three node identifiers, The edge gateways 23 and 27 may perform a function that reduces any duplicate node asset messages. For example, node asset message #F5 and node asset message #F5-1 are redundant or duplicated. So the information in one of the node asset message #F5 or #F5-1 may be deleted by the edge gateway 27.

As shown in FIG. 2C, the respective edge gateways 23 and 27 transmit aggregated messages, such as aggregated message #IT3 and aggregated message #IT7, respectively, to the fog gateway 22. The fog gateway 22 may be configured to receive a respective aggregated message, such as #IT3 and #IT7 from each of the edge gateways 23 and 27, respectively. Based on the list of the ranked node identifiers (NIDS) in the respective aggregated messages #IT3 and #IT7, the fog gateway 22 may obtain an estimate of the location of the asset tracking tag within the space.

Figure 3:
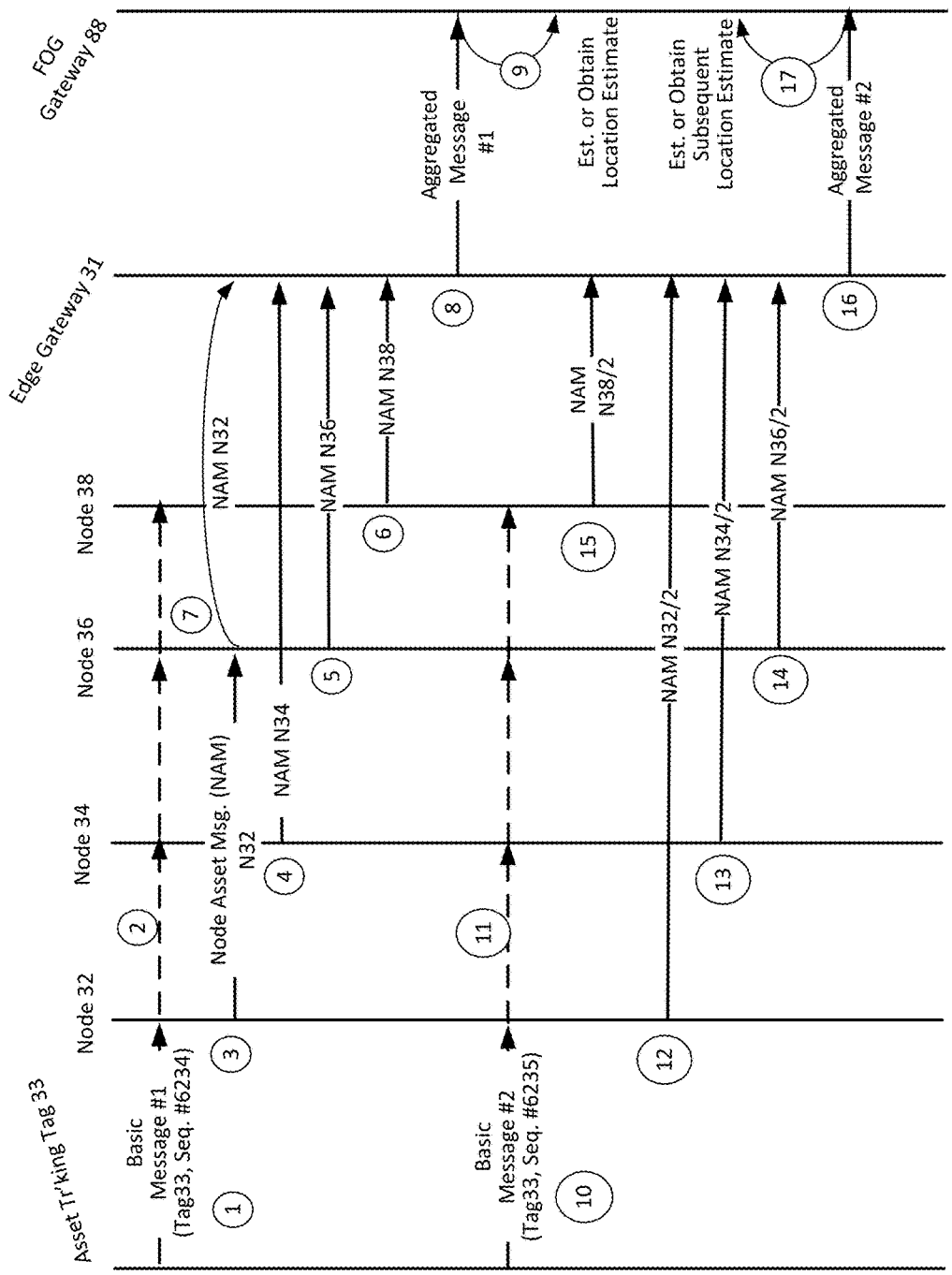
FIG. 3 is a flow diagram illustrating an example of message flow in an asset tracking and location estimate system, such as the examples described with reference to FIGS. 1-2C.

FIG. 3 is a flow diagram illustrating an example of message flow in an asset tracking and location estimate system, such as the examples described with reference to FIGS. 1-2C.

The example system of FIG. 3 includes asset tag 33, nodes 32, 24, 26 and 38, edge gateway (AI) 31, and fog gateway 88. The flow diagram of FIG. 3 differs from the examples in FIGS. 2A-2C because the asset tracking tag is sending a first basic message (basic message #1) and a subsequent basic message (basic message #2).

At instance 1, the asset tracking tag 33 may transmit via a RF transceiver coupled to asset tracking tag 33 a signal containing basic message #1 in response to an event, such as detection of movement, based on a particular count of a counter or the like. Basic message #1 may contain the tag ID of asset tracking tag 33, which is shown as Tag33, and a message sequence number, such as 6234. The basic message #1 is transmitted into the space being monitored for the provision of the asset tracking and/or asset tag location estimation process. Nodes 32, 34 36 and 38, as shown at instance 2, may receive the transmitted basic message #1. Similar to the discussion above with respect to FIG. 2B, each of nodes 32, 34 36 and 38 may measure a signal attribute of the received basic message #1. The measured signal attribute may be, for example, an RSSI, angle of arrival or other signal attribute. The respective nodes 32, 34 and 36 may each generate a respective node asset message. Each respective node asset message that contains each of the nodes respective identifiers, measured signal attribute and the information included in the basic message #1 transmitted by asset tracking tag 33.

At instances 3, 4, 5 and 6, the respective nodes 32, 34, 36 and 38 transmit the node asset messages (NAM) each of the respective nodes generated by the respective nodes (e.g. NAM N32 by node 32, NAM N34 by node 34, NAM N36 by node 36, and NAM N38 by node 38). Note that message NAM N32 is shown arriving at node 36. Node 36 may receive the NAM N32 transmitted by node 32. Node 36 upon receipt of the NAM N32 may perform a process such the process performed by fixture 4 upon receipt of the NAM #F5 from fixture 5. Node 36 after determining the NAM N32 is to be forwarded without appending any additional information, retransmits NAM N32 at instance 7 to the edge gateway 31. In contrast, the NAM messages transmitted by nodes 34, 36 and 38 are received directly by edge gateway 31.

The edge gateway 31 processes (according to the processes described in more detail with respect to the examples of FIGS. 4A and 4C) the received NAMs. Using the information in the received NAMs, the edge gateway 31 generates an aggregated message #1 using a process such as that described in the example of FIG. 2C. As explained with reference to FIGS. 4A and 4B, the aggregated message may contain the node identifiers and the ranking of the respective node identifiers and the respective measured signal attributes. The fog gateway 88 at instance 9 may use the information in the aggregated message #1, to estimate, or obtain an estimate of, a location of the asset tracking tag 33.

Subsequent to transmitting the basic message #1, the asset tracking tag 33 may generate and transmit a subsequent basic message at instance 10. For example, basic message #2 may be generated by the asset tracking tag 33 and contain the asset tracking tag identifier Tag33 and a subsequent sequence number 6235. The transmitted basic message, at instance 11, is received at nodes 32, 34, 36 and 38. The nodes 32, 34, 36 and 38 each perform the same process of measuring a respective signal attribute of the received basic message #2, and generate a NAM for transmission to an edge gateway 31. The respective nodes 32, 34, 36 and 38 reach transmit a NAM (e.g. NAM N32/2 by node 32 at instance 12, NAM N34/2 by node 34 at instance 13, NAM N36/2 by node 36 at instance 14, and NAM N38/2 by node 38 at instance 15). The edge gateway 31 receives each of these messages at instance 16, and begins processing the respective messages and generates aggregated message #2 (according to a process described in more detail with reference to the examples of FIGS. 4A and 4B). Aggregated message #2 is transmitted by the edge gateway 31 to the fog gateway 88.

The fog gateway 88 receives subsequent aggregated message #2. The received subsequent aggregated message may include the asset tracking tag identifier (e.g. Tag33), a basic message sequence number (Seq. #6235—that is different from the sequence number of basic message #1, and a subsequent list of node identifiers ranked based on a value of the measured signal attribute of the basic message #1 included in each respective node asset message. The fog gateway 88 may estimate, or obtain an estimate of, a subsequent location of the asset tracking tag using the node identifiers and the ranking of the respective node identifiers in the aggregated message to estimate the subsequent location of the asset tracking tag within the space. The estimated subsequent location may be the same as, or different from, as the preceding location.

While only one edge gateway 31 is shown in the example of FIG. 3, there may be multiple edge gateways, such as 26 and 27, that receive basic messages from the respective nodes 32, 34, 36 and 38. Each of the multiple edge gateways may transmit an aggregated message to the fog gateway 88. As a result, the fog gateway 88 may receive multiple aggregated messages that may include redundant or duplicate basic message information.

The edge gateway functions are now described in more detail with reference to the examples shown in FIGS. 4A and 4B. FIG. 4A shows a pair of edge gateways (ID: 1 and ID: 2) and examples of the node asset messages (shown by the bullet points) received by the respective edge gateways. Recall that the node asset messages are based on basic messages transmitted by an asset tracking tag, such as asset tracking tag 10. For ease of discussion and illustration, each edge gateway is shown as receiving the five (5) node asset messages. Of course, the more or less node asset messages may be transmitted by a respective node and more or less of the transmitted node asset messages may be received by an edge gateway.

In the example of FIG. 4A, the edge gateway ID 1 received respective transmitted node asset messages from three or more wireless communication nodes within a network, such as 133. For example, edge gateway ID 1 received node asset messages from nodes with respective node identifiers (NID): 1, 2, 5, 11 and 10. While edge gateway ID 2 received node asset messages from nodes within a network, such as 133, having respective node identifiers (NID): 1, 2, 7, 11 and 10.

As shown in FIG. 4A, the edge gateway may perform edge gateway processes to reduce the number of aggregated node asset messages to a number that may be efficiently used to perform an estimate of the location of the asset tracking tag when the basic message was transmitted. In an example of reducing the number of aggregated node asset messages, each of the edge gateways may wait period to time, such as 250-300 ms or the like, before transmitting an aggregated message to the fog gateway. During the waiting period, the edge gateway may eliminate duplicate received messages based on RSSI, tag identifier and the basic message sequence number.

For example, edge gateway ID 1 may be configured to evaluate the received node asset messages according to the tag ID such as TagS. Upon grouping all of the received node asset messages based on the tag ID: TagS, the edge gateway ID 1 may further parse the grouped node asset messages using the basic message sequence number, such as basic message sequence number 3, labeled as "Seq: 3" in FIG. 4A. Each edge gateway 23 and 27 may be configured to further parse the received node asset messages already parsed based on tag ID and basic message sequence number according to the measured signal attribute. Parsing according to the measured signal attribute may also include discarding respective node asset messages from the received node asset messages that have a measured signal attribute value and node ID that are duplicates of another received node asset message. In a more detailed example, recall in the example of FIG. 2B in which fixture 4 forwards node asset message #F5-1 to edge gateway 27 and fixture 5 transmits node asset message #F5, the information in node asset message #F5-1 may be a duplicate of the information in node asset message #F5. The processor of edge gateway 27 may have a time or counter and may be able to distinguish which of node asset messages #F5 and #F5-1 was received first, and the later received message may be discarded as a duplicate. Of course, other processes for discarding duplicate received messages may also be used. The edge gateway ID 1 may continue to analyze the node asset messages for additional duplicates.

Upon removal of all duplicates, the edge gateway ID 1 may continue processing the node asset messages by identifying the respective node identifiers (NID) extracted from the received node asset messages transmitted by the three or more wireless communication nodes having the highest measured signal attributes. For example, the edge gateway ID 1 may be configured to insert the NIDs in an aggregated message based on top three (or some other number) highest measured signal attributes. For example, a RSSI: –20 is higher ranking than a RSSI: –80 because a RSSI: –20 indicates a stronger signal than the RSSI: –80. In the specific example of edge gateway ID: 1, after identifying the highest measured signal attributes for use in determining which nodes are nearest to the asset tracking tag, those entries not identified may be discarded, and an aggregated message may be generated. For example, the output of the edge gateway processed of edge gateway ID 1, may be asset tracking tag ID (Tag 5), basic message sequence number (Seq.: 3), node identifiers—NIDS (10, 11 and 1), the three remaining highest measured signal attributes (e.g. RSSI values) in any order): –20, –20 and –40.

The edge gateway ID 1 may be configured to generate an aggregated message that includes the remaining node asset messages associated with the highest measured signal attributes. The edge gateway ID 1 or ID 2 may include its respective edge gateway identifier (e.g. 1 or 2) in the generated aggregated message.

The edge gateway ID 1 may forward the aggregated message to the fog gateway of the space 39 for obtaining an estimate of the location of the asset tracking tag. For example, edge gateway ID 1 may translate the aggregated message into a format or protocol compatible for transmission via a sub-GHz radio frequency and respective protocol.

Edge gateway ID 2 may perform a similar process as described above for edge gateway ID 1. For example, edge gateway ID 2 may collect a number of node asset messages, and may discard one of the duplicate node asset messages having the same asset tag identifier, basic message sequence number, a NID, and RSSI value received from NID 1 or NID 7. After evaluating the remaining node asset messages collected node asset messages, edge gateway ID 2 may identify a number of NIDS associated with node asset messages having the three highest RSSI values for use in determining which nodes as are nearest to the asset tracking tag that transmitted the node asset messages. The three highest RSSI values and the NIDs associated with the three highest RSSI values, and the respective asset tag identifier, and basic message sequence number may be used to generate an aggregated message that is transmitted to fog gateway 22.

Each of the edge gateways, such as ID 1 and ID 2, may wait a period of time, such as 250-300 ms or a particular count, such as 10,000, 24,000 or the like, before transmitting a message to the fog gateway. During the waiting period, the edge gateway may eliminate duplicate received messages based on RSSI, tag identifier and the basic message sequence number.

As shown in FIG. 4B, the fog gateway 244 may include a processor 255, RF transceiver 266 and a memory 277. The fog gateway 244 may receive via the RF transceiver 266 the respective aggregated messages transmitted by the edge gateways ID 1 and ID 2. Using the information in the respective aggregated messages received from edge gateways ID 1 and ID 2, the processor 255 may determine which nodes had the three highest measured signal attributes in all of the aggregated messages. In the example of FIG. 4B, the processor 255 of the fog gateway 244 may perform a duplicate discarding operation. As shown in FIG. 4B, two entries for NID 1 appears respectively in aggregated messages from both edge gateways ID 1 and 2, and each NID 1 entry has a measured signal attribute (i.e. RSSI in this example) of (–) 40. Therefore, one of the entries from either edge gateways ID 1 or ID 2 may be discarded. When discarded, the processor 255 of the fog gateway 244 may continue to process the remaining entries to identify the three highest RSSIs and the NIDs associated with the three highest RSSIs. In the example of FIG. 4B, the optional location estimation function 257 may be executed by the processor 255 of the fog gateway 244 to identify the three highest RSSIs in the aggregated messages from the edge gateways ID 1 and ID 2. In this specific example of FIG. 4B, the location estimation function 257 may identify the three highest RSSIs as: –20, –20 and –25, and may further identify the NIDs associated with the three highest RSSIs: 10, 11 and 9. In addition, the processor 255 of the fog gateway 244 may perform a process to remove duplicate messages or data similar to the duplicate removal process performed by the edge gateways as described above with reference to FIG. 2B. For example, multiple edge gateways, such as fog gateways ID 1 and ID 2, may receive the same node messages, which are incorporated into respective aggregated messages transmitted to the fog gateway 244 by the respective edge gateways ID 1 and ID 2. As a result, the fog gateway 244

For example, using the three NIDs, the location estimation function may be configured to access a look up table in memory 277 that has the physical locations of the nodes with the respective NIDs within the space assigned the respective NIDs, such as space 39. Using geometric techniques, such as triangulation or the like, based on the known locations of the processor 255 may be able to estimate, and thereby obtain an estimate of the location of the asset tracking tag when the basic message was transmitted.

Alternatively, the location estimation processor 255 may obtain a location estimate of the asset tracking tag based on the respective identified NIDS in each of the respective aggregated messages transmitted by the edge gateways ID 1 and ID 2 by utilizing a location service to make the asset tracking tag location estimate. For example, the fog gateway 244 may forward the identified NIDS to an IoT hub, such as 190 of FIG. 1. The IoT hub may have access to a service that has the known locations of the nodes assigned the NIDs or may request access to the known location information stored in the memory 277. Alternatively, the location information may be sent with the NIDs to the IoT hub shown in the examples of FIGS. 1 and 2A-C.

Figure 5:
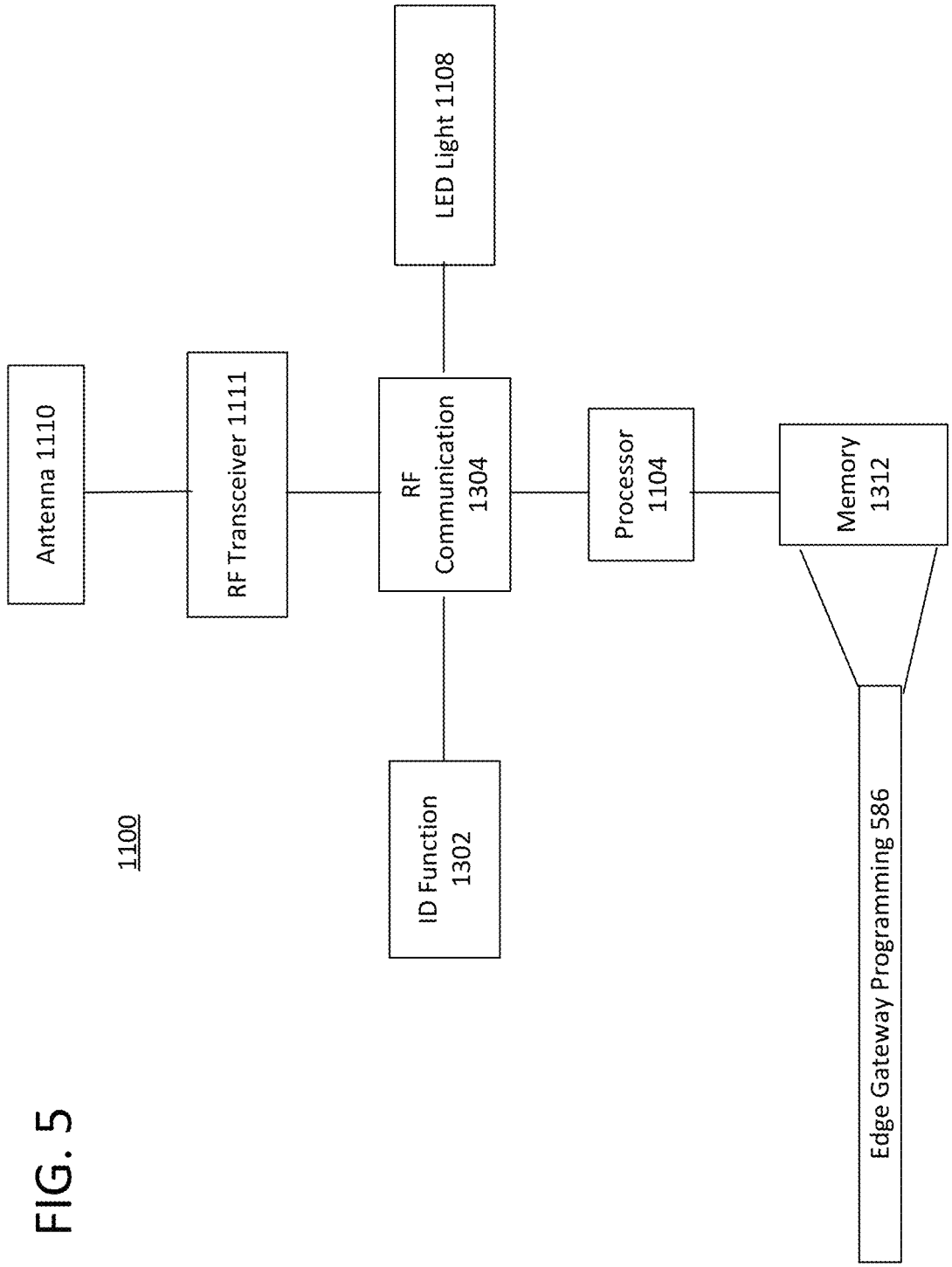
FIG. 5 depicts logical, functional, and structural features of a radio frequency communication enabled light fixture suitable for use as a node in a network of RF-enabled wireless communication nodes.

The nodes of FIGS. 2A-2C are shown in light fixtures. FIG. 5 depicts logical, functional, and structural features of an example of a radio frequency wireless communication enabled light fixture 1100, suitable for use as a node in a network of RF-enabled wireless communication nodes. An RF enabled light fixture 1100, such as the one depicted in FIG. 5, may facilitate Bluetooth transmission, basic message processing, node asset message generation and other messaging as described herein. Position detection is one particular example of an application for such an RF enabled light fixture 1100. The light fixture 1100 may include a processor 1104, LED light 1108, RF transceiver 1111, antenna 1110, sensors 1112, ID function 1302 that may handle functionality related to determining node identifier (NID) and basic message, RF communication features 1304 for communicating over the RF radio signal with other fixtures, such as fixture 4 of FIGS. 2A-2C, edge gateways 26 and 27, lighting system controllers, and/or asset tracking tags, and a memory 1312 that may be used for program storage, data storage, and the like. In an example, RF ID data that may be used by ID function 1302 may be stored in the memory 1312. In yet another example, data and other information received via the RF transceiver (TX/RX) 1111 may be stored in the memory 1312. The memory 1312 may store for example, basic messages received from asset tracking tags, lighting control information, asset tag information, time-to-live information of nodal communications, or the like.

In an example, RF communication between the RF capability of the light fixture 1100 and nearby asset tracking tags may facilitate enhanced position detection of the asset tracking tag, as will be described herein. The RF enabled light fixture 1100 is adapted for communication with other RF enabled light fixtures as well as communication with asset tracking tags, edge gateways and/or a controller within or coupled to the space. Another exemplary capability of the light fixture 1100, the asset tracking tags, edge gateways and fog gateway is bi-directional communication. While position detection via light fixtures enables the position of asset tracking devices to be determined, bi-directional RF communication allows the exchange of software updates, firmware updates, identifier updates, commissioning information, edge gateway location messages, edge gateway status messages, asset tracking tag status updates, lighting commands and the like to be received/transmitted, for example, from/to the fog gateway to the respective devices collocated with (e.g., edge gateways, light sources) or in communication with the light fixture 1100 (e.g., asset tracking tags or the like).

RF communication capabilities typically comply with some network-like standard, such as Bluetooth. As an example, a Bluetooth network standard includes unique identifiers for each Bluetooth device that is connected to a network. In a similar way, each RF enabled light fixture 1100 in the network may be configured with a unique node identifier (e.g. NID). As explained above, the NID may be used when determining a position of an asset tracking tag within a space.

It is also envisioned that to further reduce network traffic and interference in some of the frequency bands used in the system, for example, the 2.4 GHz range commonly associated with Bluetooth, the edge gateway may be configured to utilize a different frequency band. For example, in addition to a 2.4 GHz radio frequency transceiver the edge gateway may be equipped with a different radio frequency transceiver, such as a sub-GHz radio frequency transceiver. The fog gateway may also be configured with a sub-GHz RF transceiver in order to facilitate communication with the edge gateways, such as 23 and 27 of FIGS. 2A-C.

In order to better explain this additional sub-GHz RF transceiver implementation it may be helpful to referring back to FIG. 2B. In FIG. 2B, the transmitted node asset messages transmitted by the respective fixtures 2, 3, 5, 6, and 8 and retransmitted by fixture 4 for reception by the respective edge gateways 23 and 27 are transmitted in the 2.4 GHz frequency band typically associated with the Bluetooth standard. In FIG. 2C, the aggregated messages are transmitted by the edge gateways 23 and 27 to the fog gateway 22. These aggregated messages may also be transmitted in the 2.4 GHz frequency band typically associated with the Bluetooth standard. However, in this alternate example, the edge gateways 23 may be configured with a first radio frequency transceiver that operates in a first frequency band and a second radio frequency transceiver that operates in a second frequency band different from the first frequency band. The following discussion describes various implementations of an edge gateway configured with a first RF transceiver and a second RF transceiver.

Figure 6A:
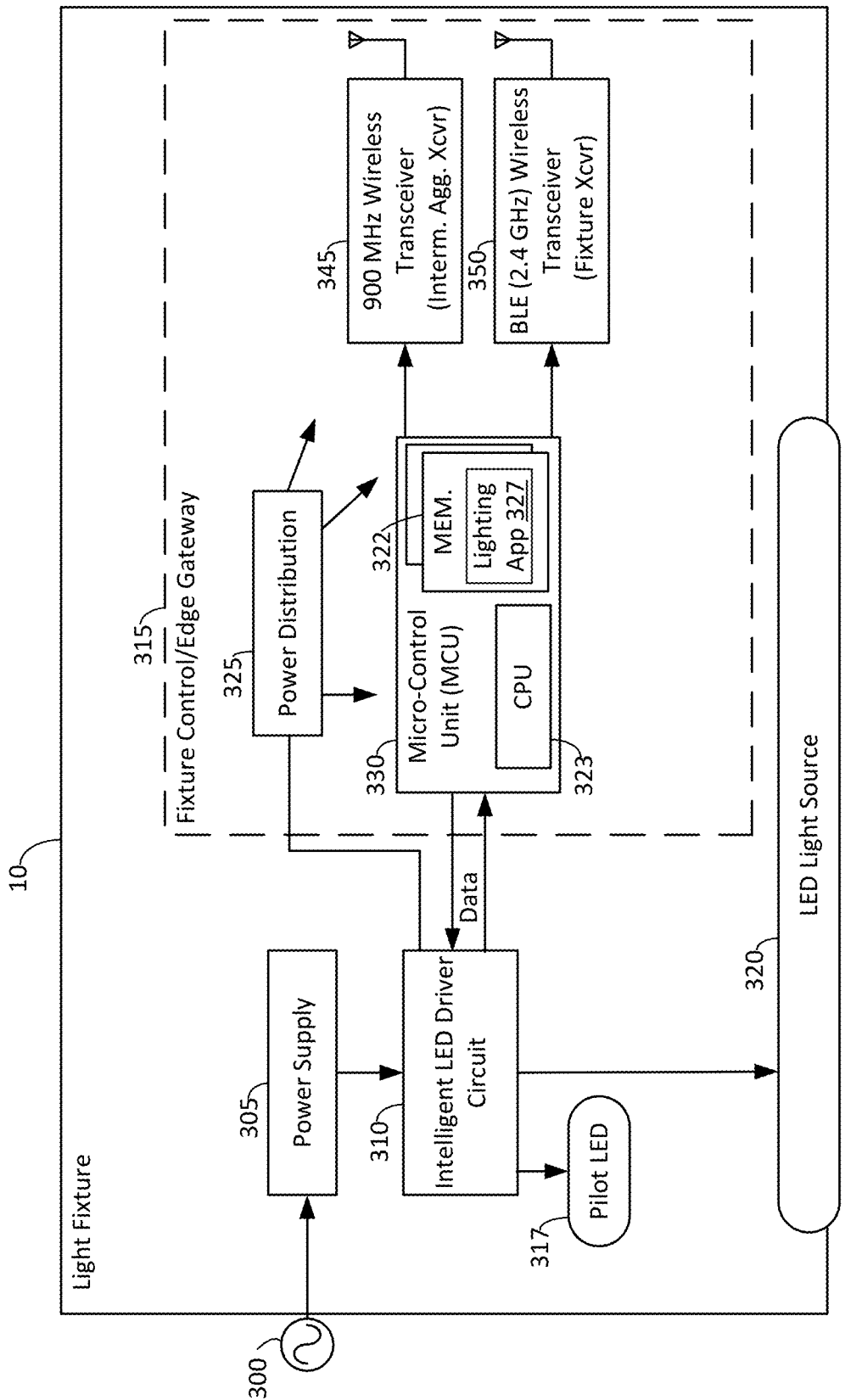
FIGS. 6A-6C depict logical, functional, and structural features of several examples of a radio frequency communication enabled light fixture suitable for use as a node and an edge gateway in a network of RF-enabled wireless communication nodes.
Figure 6B:
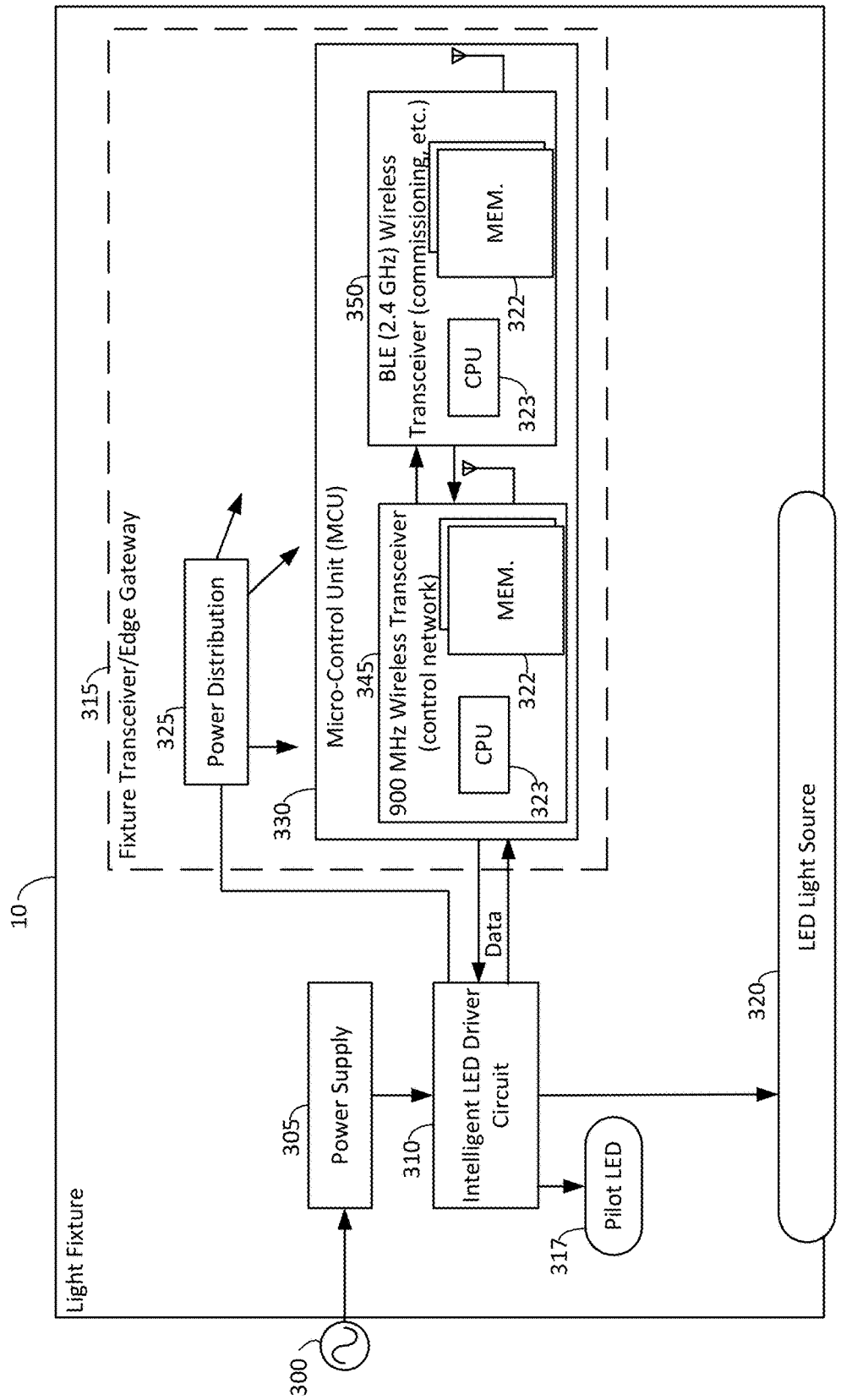
Figure 6C:
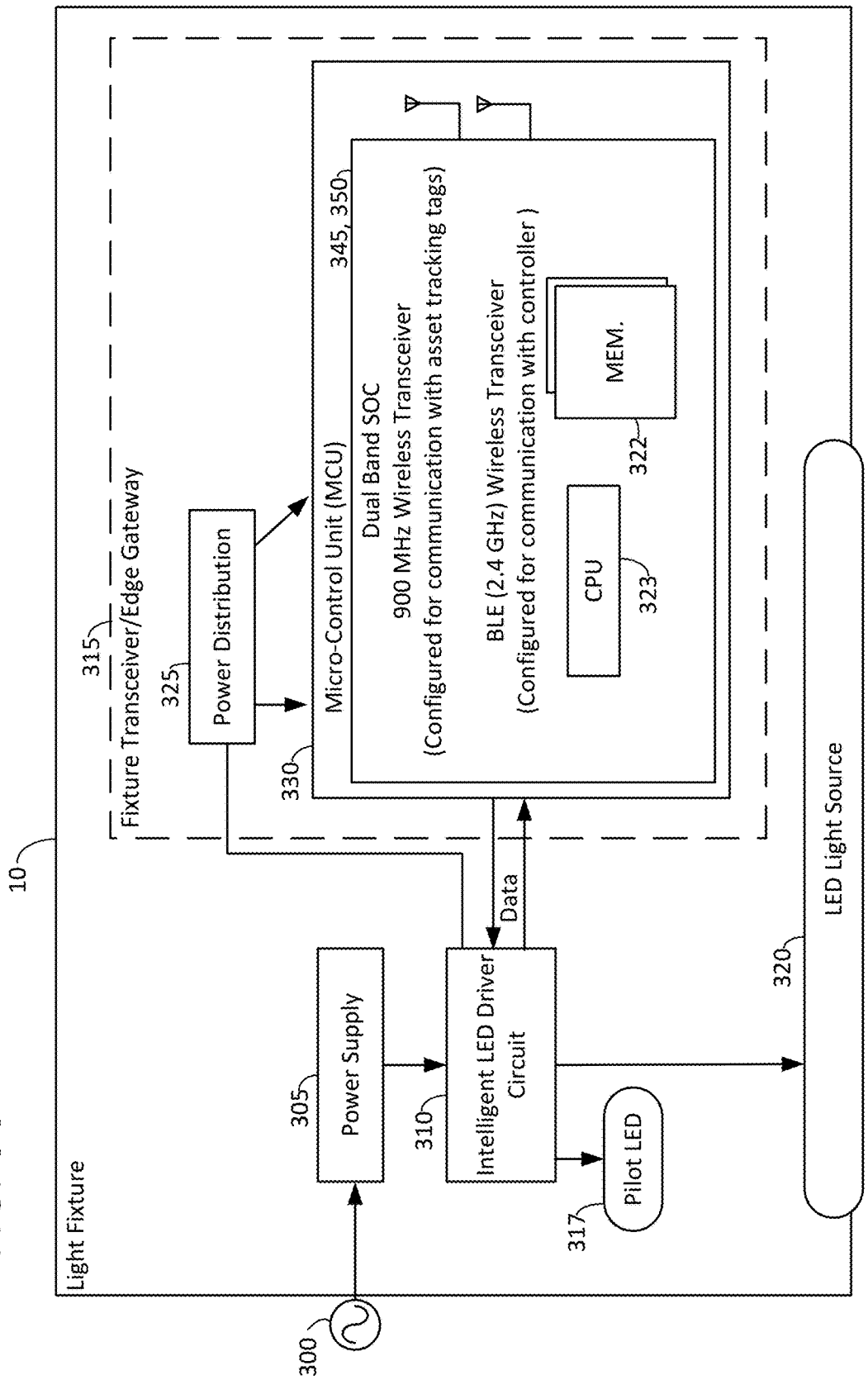

FIGS. 6A-C are block diagrams of a light fixture 10 that communicate as a node within the network of RF-enabled wireless communication nodes of FIG. 1. Light fixture 10 is an integrated light fixture that generally includes a power supply 305 driven by a power source 300. Power supply 305 receives power from the power source 300, such as an AC mains, battery, solar panel, or any other AC or DC source. Power supply 305 may include a magnetic transformer, electronic transformer, switching converter, rectifier, or any other similar type of circuit to convert an input power signal into a power signal suitable for light fixture 10.

Light fixture 10 furthers include an intelligent LED driver circuit 310, fixture control/edge gateway 315, and a light emitting diode (LED) light source 320. Intelligent LED driver circuit 310 is coupled to LED light source 320 and drives that LED light source 320 by regulating the power to LED light source 320 by providing a constant quantity or power to LED light source 320 as its electrical properties change with temperature, for example. The intelligent LED driver circuit 310 includes a driver circuit that provides power to LED light source 320 and a pilot LED 317. Intelligent LED driver circuit 310 may be a constant-voltage driver, constant-current driver, or AC LED driver type circuit that provides dimming through a pulse width modulation circuit and may have many channels for separate control of different LEDs or LED arrays. An example of a commercially available intelligent LED driver circuit 310 is manufactured, for example, by EldoLED.

LED driver circuit 310 can further include an AC or DC current source or voltage source, a regulator, an amplifier (such as a linear amplifier or switching amplifier), a buck, boost, or buck/boost converter, or any other similar type of circuit or component. LED driver circuit 310 outputs a variable voltage or current to the LED light source 320 that may include a DC offset, such that its average value is nonzero, and/or an AC voltage. The pilot LED 317 indicates the state of the light fixture 10, for example, during the commissioning and maintenance process. The light fixture 10 is line powered and remains operational as long as power is available.

For purposes of communication and control, light fixture 10 may be treated as single addressable device by the fog gateway that can be configured to operate as a member of one or more lighting control groups or zones. For example, light fixture 10 that functions as an edge gateway may be strategically located to more likely receive node asset messages from a likely group of light fixtures not configured with an edge gateway, such as fixtures 1, 4, 5, 7 and 8 of FIGS. 2B and 2C. Meanwhile, fixture 3 may be configured with an edge gateway, and be located to receive node asset messages from light fixtures 2, 3, 5 and 9. Of course, there may be some overlap between the likely coverage areas of the respective edge gateways 23 and 27. For example, edge gateways 23 and 27 may be equally likely to receive node asset messages from fixtures 1, 5 and 9.

Fixture control/edge gateway 315 includes power distribution circuitry 325, a micro-control unit (MCU) 330, drive/sense circuitry 335, and detector(s) 365. As shown, MCU 330 is coupled to LED driver circuit 310 and controls the light source operation of the LED light source 320. MCU 330 includes a memory 322 (volatile and non-volatile) and a central processing unit (CPU) 323. The memory 322 includes a lighting application 327 (which can be firmware) for both lighting control operations and commissioning, maintenance, and diagnostic operations. The power distribution circuitry 325 distributes power and ground voltages to the MCU 330, drive/sense circuitry 335, wireless transceivers 345 and 350, and detector(s) 365 to provide reliable operation of the various circuitry on the fixture control/edge gateway 315 chip.

In the example of FIGS. 6A-C, light fixture 10 also includes a dual-band wireless radio communication interface system configured for two way wireless communication. It should be understood that "dual-band" means communications over two separate RF bands. For example, a system control radio frequency transceiver may be configured to transmit and receive signals in a second frequency band different from the first frequency band. In some examples, each of the edge gateways may be configured to transmit the aggregated message via the system control radio frequency transceiver for receipt by the fog gateway, such as 22 of FIGS. 2A-C. The communication over the two separate RF bands can occur simultaneously (concurrently); however, it should be understood that the communication over the two separate RF bands may not actually occur simultaneously. In our example, light fixture 10 has a radio set that includes first RF transceiver 345 for sub-GHz communications (also referred to as the system control RF transceiver) and a second RF transceiver 350 for Bluetooth RF communications. The first transceiver 345, such as a 900 MHz wireless transceiver, may issue control operations for lighting control via a nodal network (e.g., the network of RF-enabled wireless communication nodes, such as 133 of FIG. 1). This first transceiver 345 is for wireless communication over the first RF range with other light fixtures for lighting control purposes and for asset tracking tag location estimation both via the nodal network. Two transport methods may be sent via the network layer function of the first transceiver 345: unicast and multicast. The first transceiver 345 engages in multicast group communication of a one-to-many (e.g. a flooding network protocol) or a many-to-many distribution where group communication is addressed to a group simultaneously (e.g. multiple fixtures commonly assigned to function together, such as fixture 1, 5 and 9, or a group of asset tracking tags, such as 10 and 20, of FIGS. 2A-2C).

A second transceiver 350, such as a 2.4 GHz BLE (Bluetooth) wireless transceiver receives commands from the fog gateway (not shown in this example) that related to commissioning, maintenance, and diagnostics of the lighting fixtures. This second transceiver 350 is for point-to-point communication between the edge gateway and the fog gateway, over a second of the two different RF frequency bands (i.e. wireless communication bands), of information (such as aggregated messages in the asset tracking location estimation process explained with reference to FIGS. 1-4B). In addition, the second transceiver 350 may receive from the fog gateway control and systems operations information, concurrently with at least some communications over the first wireless communication band of the first transceiver 345.

As shown, the MCU 330 includes programming in the memory 322 which configures the CPU (processor) 323 to control operations of the respective light fixture 10, including the communications over the two different wireless communication bands via the dual-band wireless radio communication interface system 345, 350. The programming in the memory 322 includes firmware/software that enables operation of an asset tracking tag communication and location estimation processes as well as commissioning and maintenance of the light fixture via a lighting system fog gateway, such as 130 or 22 of FIGS. 1 and 2A-C, respectively. The programming in the memory 322 may, for example, enable the processor 323 to carry out lighting control operations over the system 100 via the network of RF-enabled wireless communication nodes of FIG. 1, or the system 200 of FIGS. 2A-2C.

Three different CPU and memory architectures are shown for the fixture control/edge gateway 315 and the MCU 330 of the light fixture 10 in FIGS. 6A-6C. In FIG. 6A, in addition to the memory 322 and the CPU 323 of the MCU 330 itself, the first transceiver 345 and the second transceiver 350 each include a separate memory (not shown) and a processor (not shown).

In FIG. 6B, the MCU 330 itself does not include a separate memory 322 and a CPU 323. Instead, only the first transceiver 345 and the second transceiver 350 each include a separate memory 322 and a processor 323. For efficiency purposes, such as to save manufacturing costs and conserve power (e.g., line power or battery power), the memory 322 and CPU 323 of the first transceiver 345 is selected to perform processing because the majority of processing (normal lighting control operations) occur over the sub-GHz wireless control network 5. Hence, in the example of FIG. 6B, the sensor/control module 315 includes a total of two processors and two sets of memory.

In FIG. 6C, the MCU 330 comprises a dual band system on chip (SOC) 345, 350 and the MCU 330 itself does not include a separate memory 322 and a CPU 323. Instead, the first transceiver 345 and the second transceiver 350 are integrated and combined into the chipset of the MCU 330. Hence, in the example of FIG. 6C, the fixture control/edge gateway 315 includes a total of one processor and one set of memory. Integrating the first transceiver 345 and second transceiver 350 into a dual band SOC chipset of the MCU 330, saves manufacturing costs and conserves power (e.g., line power or battery power).

Operationally, the process described with respect to FIGS. 2A-2C remains substantially the same when the edge gateway is configured with the first RF transceiver and the second RF transceiver. For example, the processor 323 of FIGS. 6A-6C may convert the node asset messages generated in response to receipt of the basic messages from an asset tracking tag according to protocol into a data packet suitable for transmission via the second RF transceiver as a aggregated message, or other type of message, such as a status message, control signal acknowledgement or the like. Conversely, the processor 323 of FIGS. 6A-6C may be configured to receive signals via the second RF transceiver and convert the received signals according to a protocol into data packets suitable for transmission via the first RF transceiver to, for example, either the asset tracking tags or to other fixtures.

FIG. 7 illustrates a specific example of a system configuration and message flow diagram that utilizes system-on-a-chip (SOC) configurations for an asset tracking tag system, such as those shown in FIGS. 2A-3.

Each of asset tracking tags (AT) 71-75 are configured with a BLE SOC that provides BLE communication capabilities to the respective ATs 71-75. Each AT has a BLE identifier that is globally unique to the respective AT. Of the fixtures 750, two are shown as being configured as edge gateways (e.g., 76 and 77) and one is shown as a BLE-only fixture, such as fixture 4 of FIG. 2A. The edge gateways 76 and 77 are configured with two different RF transceivers, a BLE SOC that includes a BLE transceiver and a Sub-GHz SOC that includes a sub-GHz transceiver. Both the BLE SOC and Sub-GHz SOC are coupled to a memory, such as SPI flash memory. The edge gateways 76 and 77 are configured to receive BLE compatible basic messages from the ATs 71-75 via the BLE SOC in the respective aggregators. Upon receiving the basic messages via the BLE SOC of the edge gateway, the BLE SOC may measure a signal attribute of the received basic message. The edge gateway BLE SOC is configured to extract the respective node ID from memory, and generate a node asset message by translating the basic message into a format suitable for transmission via the Sub-GHz frequency band. The BLE SOC may also append the node ID extracted from memory and the measured basic message signal attribute to the node asset message. The node asset message is passed to the Sub-GHz SOC. The Sub-GHz SOC may perform the functions of an edge gateway as described with respect to FIGS. 2B and 2C. The Sub-GHz SOC may generate an aggregated message from all of the node asset messages received from the fixtures 750. The respective edge gateway sub-GHz SOC may forward the aggregated message for processing by the fog gateway 770. In the example of FIG. 7, the fog gateway 770 is configured with a fog gateway adapter 771. The fog gateway adapter 771 has a sub-GHz SOC that includes a 900 MHz transceiver, a processor (CPU), and a serial port. The serial port allows the fog gateway adapter to connect to and receive power from the fog gateway 770. The fog gateway adapter 771 receives the aggregated messages and may via the CPU process the received aggregated messages as described with reference to FIGS. 4A and 4B. Alternatively, the received aggregated messages may be passed to fog gateway 770. The information in the aggregated messages is used to estimate, or obtain an estimate of, a location of the asset tracking tag when the basic message was transmitted by the asset tracking tag.

Figure 8:
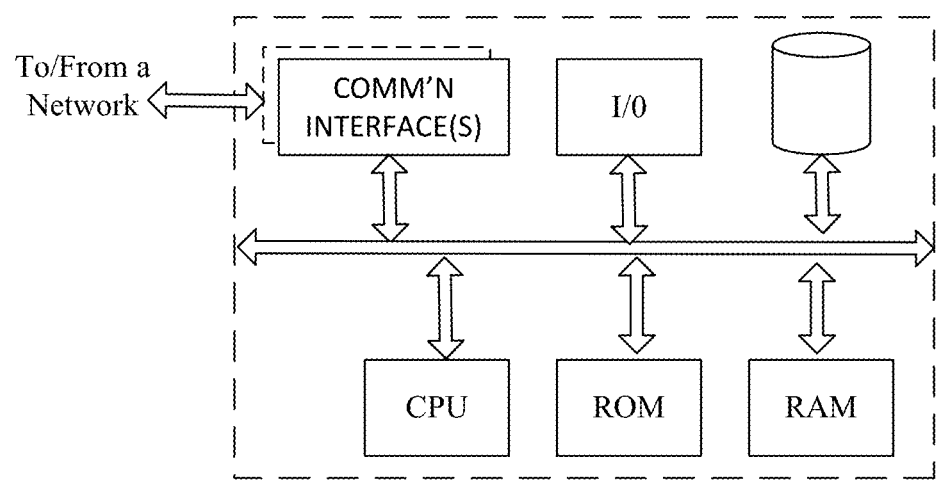
FIG. 8 illustrates a computing device that may configured to be a wireless communication node in a network, a processor and memory of an edge gateway, fog gateway, or controller of a lighting system.

FIG. 8 illustrates a computing device that may configured to be a wireless communication node in a network, a processor and memory of an edge gateway, or fog gateway of a lighting system. Hardware of the computing device example of FIG. 8 includes a data communication interface for packet data communication. The computing device also includes a central processing unit (CPU), in the form of circuitry forming one or more processors, for executing program instructions. The computing device hardware typically includes an internal communication bus, program and/or data storage for various programs and data files to be processed and/or communicated by the computing device, although the computing device often receives programming and data via network communications. The hardware elements, operating systems and programming languages of such computing devices are conventional in nature, and it is presumed that those skilled in the art are adequately familiar therewith.

Herein, wireless RF communication is on occasion denoted by reference to "Bluetooth," but any wireless communication means may be similarly employed and all such are implicitly intended, subject to constraints arising from variations in capability, wherever "Bluetooth" and related terms are used. Examples of wireless RF communication means intended herein, without limitation, include Bluetooth, Bluetooth-Low-Energy (BLE), Wi-Fi, Enhanced NFC, Zigbee, X10, WiMax, 3G, 4G, LTE and the like.

Program aspects of the technology discussed above may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a premises-related server into the apparatus 200 of FIG. 2, including both programming for individual element functions, such as audio encoding and decoding, response messages and the like. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The foregoing discussion referred to details of tag location estimation using a signal transmitted by an asset tag that is received by respective nodes in a space. Each of the respective nodes measure a received basic message signal attribute, and transmit a node asset message including the asset tracking tag identifier, the basic message sequence number, a node identifier, and the measured signal attribute of the received basic message to an edge gateway node. The edge gateway may receive the transmitted node asset message transmitted by each of some number of the wireless communication nodes and rank respective node identifiers extracted from the received node asset messages based the measured signal attribute. As described above, the edge gateway forwards an aggregated message to a fog gateway for obtaining an estimate of the location of the asset tracking tag.

Various methods and systems for obtaining an estimate of the location of the asset tag may be used. Examples of the methods and systems for obtaining an estimate of the location of the asset tag are disclosed in the contemporaneously filed patent application Ser. No. 15/916,893 entitled More Accurate Asset Tag Locating of Radio Frequency Devices. The entire contents of which are incorporated herein by reference.

Examples of estimating the location of an asset tag may include forming an ordered tuple in the aggregated message sent to the fog gateway in a manner analogous to forming the tuple in the above-incorporated application but here containing the ranked respective node identifiers along with the asset tracking tag identifier, the basic message sequence number, and possibly the measured signal attribute values. The tuple may be substantially the same as the list of a number of node identifiers in association with a respective one of the highest measured signal attribute values described with the examples of FIG. 4B of the present application.

The computing device, e.g. at or coupled to the fog gateway, may be configured to determine, based on the generated tuple and the specific node locations associated with the transmitting node identifiers, that the asset tag is located within a polygonal region in which the vertices of the polygonal region are the specific node locations of the transmitting node identifiers. In a specific example, using three node identifiers, the computing device may be configured to determine a location of the asset tag within a triangular region (e.g. Δabc) formed by using the specific node locations of the three obtained node identifiers as vertices of the triangular region. This determination of the location of the asset tag within the polygonal region in the space may be referred to as a coarse asset tag location determination.

The computing device may evaluate the order of the node identifiers in the list of node identifiers using a data set with a list of inequalities of the measured signal attributes. The computing device, for example, may as part of the evaluation compare the order of the node IDs in the tuple to an order of elements in the inequalities of the obtained data set or look up table. Based on the results of the comparison, the computing device may identify an inequality corresponding to an order of the node IDs in the list of node identifiers. As part of the list of inequalities, each inequality may include an indication of a subregion within the determined polygonal region. Using the identified inequality and the subregion indication, the computing device may estimate the location of the asset tag as being located in indicated subregion. This may be considered a fine estimation of the asset tag location.

An additional process may alter the area of the respective subregions based on differences between the respective signal attribute measurements determined by the asset tag. For example, a difference between a first signal attribute measurement value and a second signal attribute value may be determined, a difference between the first signal attribute measurement value and a third signal attribute measurement value may be determined, and a difference between first signal attribute measurement value and the third signal attribute value may be determined. These differences may be referred to as delta values.

The example tag position estimation calculation based on node IDs from an ordered tuple is described in the discussion of FIG. 8 in the VLC-155US application, and is incorporated herein in its entirety by reference.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Thus the following claims are hereby incorporated into the Detailed Description, with each claim standing on its own as a separately claimed subject matter.

What is claimed is:

1. A method, comprising:
   receiving, at three or more wireless communication nodes distributed about a space, a basic message transmitted by an asset tracking tag, the basic message including an identifier of the asset tracking tag and a basic message sequence number;
   at each of the three or more wireless communication nodes, measuring a signal attribute of the received basic message and associating the measured signal attribute with a node identifier of the respective wireless communication node making the signal attribute measurement;
   transmitting, by each of the three or more wireless communication nodes, a node asset message to an edge gateway, the node asset message including the asset tracking tag identifier, the basic message sequence number, the node identifier of the respective one of the three or more wireless communication nodes transmitting the respective node asset message, and the measured signal attribute of the basic message measured by the respective one of the three or more wireless communication nodes transmitting the respective node asset message;
   receiving, at the edge gateway, the respective transmitted node asset message transmitted by each of the three or more wireless communication nodes;
   determining, by the edge gateway, a number of the respective node identifiers nearest to the asset tracking tag based on the measured signal attribute of the basic message; and
   forwarding, by the edge gateway to a fog gateway of the space, an aggregated message including the asset tracking tag identifier, the basic message sequence number, a list of the number of node identifiers in association with a respective one of the highest measured signal attribute values, and an identifier of the edge gateway, the aggregated message for obtaining an estimate of the location of the asset tracking tag.

2. The method of claim 1, further comprising:
   estimating via the fog gateway a location of the asset tracking tag within the space by using the list of the number of node identifiers in the forwarded aggregated message.

3. The method of claim 1, wherein measuring the signal attribute of the received basic message comprises:
measuring a received signal strength of the received basic message.

4. The method of claim 1, wherein a predetermined number of the node identifiers are in the ranked list as identified by the edge gateway, and the predetermined number of node identifiers is at least three.

5. The method of claim 1, further comprising:
using, by the fog gateway, the ranking of the respective node identifiers in the list of ranked node identifiers to estimate a location of the asset tracking tag within the space.

6. The method of claim 1, further comprising:
parsing, by the edge gateway, the received node asset messages according to the measured signal attribute; and
discarding respective node asset messages from the received node asset messages having a node identifier, a basic message sequence number and a measured signal attribute value that is a duplicate of another measured signal attribute.

7. The method of claim 1, further comprising:
receiving subsequent aggregated messages at the fog gateway, wherein each of the received subsequent aggregated messages includes the asset tracking tag identifier, a different basic message sequence number, and a subsequent list of node identifiers ranked based on a value of the measured signal attribute of the basic message included in each respective node asset message.

8. The method of claim 7, further comprising:
estimating, by the fog gateway, a subsequent location of the asset tracking tag using the node identifiers and the ranking of the respective node identifiers in the aggregated message to estimate the subsequent location of the asset tracking tag within the space.

9. The method of claim 1 further comprising:
transmitting, by the asset tracking tag located with a space, the basic message into the space in response to an event or a stimulus detected by the asset tracking tag, wherein an event is a change of a counter value to a predetermined value, a timing event, or receipt of an input signal from an external source, and a detected stimulus may be a temperature, a movement, a noise, or an ambient light.

10. The method of claim 1, further comprising:
detecting motion, by a motion sensor of the asset tracking tag, the detected motion indicating that the asset tracking tag is being moved from a present location within the space, and wherein the transmitting of the basic message by the asset tracking tag is in response to the detected motion.

11. A system, comprising:
a plurality of wireless communication nodes distributed about a space, wherein:
each of the plurality of wireless communication nodes comprises:
a processor,
a memory,
a node radio frequency transceiver configured to receive and transmit radio frequency signals and
a number of edge gateways, wherein each of the edge gateways comprises a processor, an edge gateway radio frequency transceiver, and a memory, wherein:
the edge gateway radio frequency transceiver is configured to communicate with the node radio frequency transceivers of the wireless communication nodes;
a fog gateway communicatively coupled to each of the edge gateways, the fog gateway comprising a fog gateway radio frequency transceiver, a processor and a memory, the fog gateway radio frequency transceiver configured to communicate with the edge gateway transceiver;
wherein each of the plurality of wireless communication nodes is configured to:
receive a basic message transmitted by an asset tracking tag located in the space, wherein the basic message includes an identifier of the asset tracking tag and a basic message sequence number;
measure a signal attribute of the received basic message;
associate in the node memory the measured signal attribute with a node identifier of the wireless communication node that made the signal attribute measurement; and
transmit, a node asset message to an edge gateway of the number of edge gateways, the node asset message including the asset tracking tag identifier, the basic message sequence number, the node identifier of the respective wireless communication node transmitting the respective node asset message, and the measured signal attribute of the basic message measured by the respective wireless communication node transmitting the respective node asset message; and
wherein each edge gateway is configured to:
receive the respective transmitted node asset message transmitted by each of the three or more wireless communication nodes;
identify a number of the respective node identifiers associated with highest values of the measured signal attribute of the basic message; and
forward to the fog gateway, an aggregated message including the asset tracking tag identifier, the basic message sequence number, a list of the node identifiers associated with a respective one of the highest measured signal attribute values, and an identifier of the respective edge gateway forwarding the aggregated message;
wherein the fog gateway is configured to:
receive a respective aggregated message from each of the edge gateways; and
obtain an estimate of the location of the asset tracking tag within the space based on the list of the node identifiers, and the measured signal values associated with each respective node identifier in the list of node identifiers in the aggregated message forwarded by each respective edge gateway.

12. The system of claim 11, wherein each of the edge gateways, further comprises:
a system control radio frequency transceiver configured to transmit and receive signals in a second frequency band different from the first frequency band; and
each of the edge gateways are configured to:
transmit the aggregated message via the system control radio frequency transceiver for receipt by the fog gateway.

13. The system of claim 12, wherein the system control radio frequency transceiver is configured to operate within the second frequency band operates in a frequency band different from the first frequency band, and is one of a sub-GHz transceiver, a Zigbee transceiver, a radio frequency identifier (RFID) transceiver, a Wi-Fi transceiver, or an Ethernet connection.

14. The system of claim 11, further comprising:
a plurality of lighting fixtures distributed throughout the space, wherein a number of individual wireless communication nodes of the plurality of wireless communication nodes are each collocated with a respective lighting fixture of the plurality of lighting fixtures distributed throughout the space.

15. The system of claim 11, wherein each of the wireless communication nodes are further configured when measuring the signal attribute of the received basic message to:
measure a received signal strength of the received basic message,
determine an angle of arrival of the received basic message, or
both.

16. The system of claim 11, wherein the node radio frequency transceiver is one of a Bluetooth transceiver, a Zigbee transceiver, a radio frequency identifier (RFID) transceiver, a sub-GHz transceiver, or a Wi-Fi transceiver, and the first frequency band corresponds to the respective one of the transceivers.

17. The system of claim 11, wherein the number of edge gateways is less than a number of wireless communication nodes in the plurality of wireless communication nodes.

18. The system of claim 11, wherein the asset tracking tag comprises:
an asset tracking tag radio frequency transmitter configured to communicate with the plurality of wireless communication nodes.

19. The system of claim 18, wherein the asset tracking tag further comprises:
a memory, and
logic circuitry configured to process signals received during communication with the plurality of wireless communication nodes,
wherein:
the asset tracking tag transmitter is configured to transmit signals having a frequency within the first frequency band, and
the transmitted signals containing a basic message, the basic message including an identifier of the asset tracking tag and a basic message sequence number as the asset tracking tag moves about a space.

20. The system of claim 19, wherein the asset tracking tag is affixed to an item that is movable within the space.

21. The system of claim 11, wherein each of the number of edge gateways and the fog gateway are each further configured to
exchange software updates, firmware updates, identifier updates, commissioning information, edge gateway location messages, edge gateway status messages, asset tracking tag status updates, or lighting commands.

* * * * *